United States Patent
Kagami et al.

(10) Patent No.: US 6,242,535 B1
(45) Date of Patent: Jun. 5, 2001

(54) HOLLOW VESSEL FOR HEAT STERILIZATION

(75) Inventors: Mamoru Kagami, Edogawa-ku; Seiki Maeda; Yasuo Tanaka, both of Ichihara, all of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/455,795

(22) Filed: Dec. 7, 1999

(30) Foreign Application Priority Data

Dec. 7, 1998 (JP) ................................... 10-347560

(51) Int. Cl.$^7$ ............................ C08L 23/00; C08L 23/04; A61L 2/08; A23L 3/16
(52) U.S. Cl. ............................ 525/191; 525/240; 422/26; 422/28; 426/521
(58) Field of Search .................................... 525/191, 240; 422/26, 28; 426/521

(56) References Cited

U.S. PATENT DOCUMENTS 4,740,529   4/1988   Taka et al. .

FOREIGN PATENT DOCUMENTS

| 0792914A | 9/1997 | (EP) . |
| 0844280A | 5/1998 | (EP) . |
| 0936247A | 8/1999 | (EP) . |

Primary Examiner—Nathan M. Nutter
(74) Attorney, Agent, or Firm—Sherman & Shalloway

(57) ABSTRACT

A hollow vessel for heat sterilization, which is superior in the transparency and in the impact resistance with scarce odor, made of a polyolefin resin having characteristic properties comprising an underwater light transmittance of 70–99% resulting from determination of light transmission at a wave length of 450 nm for a resin specimen of a thickness of 0.5 mm which has been subjected to a heat sterilization treatment with steam at a temperature of 121° C. for 20 minutes;

a tensile elastic modulus of 200–700 MPa, determined according to ASTM D 638 for a resin specimen of a thickness of 0.5 mm which has been subjected to a heat sterilization treatment with steam;

a haze value difference Δ Haze of 1–20%, determined according to ASTM D 1330 for a resin specimen of a thickness of 0.5 mm respectively before and after a heat sterilization treatment thereof with steam; and a high-speed impact strength of 1.5–10 J, determined on an impact test at 0° C. as the total rupture energy required for rupturing a resin specimen of 0.5 mm×9 cm×9 cm which has been subjected to a heat sterilization treatment with steam, wherein the impact test is carried out by settling the specimen on a jig having a hole of 1 inch diameter for receiving an impinging weight having an impact top of a diameter of 0.5 inch and causing the weight to impinge thereonto at an impingement speed of 3 m/sec.

28 Claims, No Drawings

HOLLOW VESSEL FOR HEAT STERILIZATION

FIELD OF THE INVENTION

The present invention relates to a hollow vessel for use for heat sterilization, made of a polyolefin resin. More specifically, the invention concerns a hollow vessel made of a polyolefin resin, which is superior in the transparency and in the impact strength, emits scarce unpleasant smell and maintains these characteristic properties at a high level, in particular for the transparency, even after the vessel has been subjected to a steam sterilization procedure, so that it can be used favorably for container of food product and medical goods and utensils.

BACKGROUND OF THE INVENTION

Hollow vessels made of a polyolefin resin, such as polypropylene resin, are, in general, superior in the stiffness, heat resistance and chemical resistance, nevertheless they reveal usually disadvantages of lower transparency and inferior impact resistance. For remedying these disadvantages, polyolefinic resins in which these inferior properties are improved have been brought into practical use. Proposals for such improved polyolefinic resins include, for example, a resin composition in which a linear polyethylene and an elastomer component are blended with a polypropylene resin (Japanese Patent Kokai Sho 61-98756 A), a resin composition in which a polymerization product of ethylene is blended with a polypropylene resin (Japanese Patent Kokai Hei 6-31796 A), a resin composition in which a polymerization product of 3-methylbutene-1 is blended with a polypropylene resin (Japanese Patent Kokai Hei 3-14852 A, corresponding to U.S. Pat. No. 5,286,540 and to EP 417319 A1) and a resin composition in which a specific nucleation enhancing agent is blended with a polypropylene resin (Japanese Patent Kokai Sho 60-127336, corresponding to EP 151741 A2).

Hollow vessels made of conventionally proposed polyolefin resins such as above have problems, that an improvement in the impact strength may accompany a decrease in the transparency and that an improvement in the transparency may cause unpleasant smell or may cause decrease in the impact strength. Moreover, it is also problematic that hollow vessels of prior art are subject to decrease in the transparency upon a heat sterilization with saturated steam, whereby visibility of the contents retained in the vessel, such as a drink or medical goods, is decreased and their state becomes unrecognizable.

When a nucleation enhancing agent is blended in the resin of the vessel for improving the transparency of the vessel, the productivity of the vessel becomes decreased due to high crystallization rate, in addition to an unfavorable consequence that such an additive may often cause emission of unpleasant smell and is not preferred for such hollow vessels. Especially, in the case of hollow vessels to be served for enclosing medical goods and food products therein, such problems as emission of smell and migration of the additive from the resin of the vessel into the contents thereof are the greatest defect. When a resin composition in which an ethylenic polymer is blended with a polypropylene resin for improving the impact strength is used as the material of the hollow vessel, an increase in the amount of the ethylenic polymer for increasing the impact strength will cause decrease in the transparency, so that hollow vessels having satisfactory properties may scarcely be reached.

SUMMARY OF THE INVENTION

An object of the present invention is to provide a hollow vessel for heat sterilization made of a polyolefin resin, which is superior in the transparency and in the impact strength and causes scarce emission of smell and which preserves these superior properties, in particular, transparency, even after it has been subjected to a heat sterilization with steam.

The hollow vessel for heat sterilization according to the present invention is defined as follows:

(1) A hollow vessel for heat sterilization, made of a polyolefin resin having characteristic properties comprising
1) an underwater light transmittance of 70–99% resulting from determination of light transmission at a wave length of 450 nm for a resin specimen of a thickness of 0.5 mm which has been subjected to a heat sterilization treatment with steam at a temperature of 121° C. for 20 minutes,
2) a tensile elastic modulus of 200–700 MPa, determined according to ASTM D 638 for a resin specimen of a thickness of 0.5 mm which has been subjected to a heat sterilization treatment with steam at a temperature of 121° C. for 20 minutes,
3) a haze value difference $\Delta$ Haze between the $Haze_2$ value and the $Haze_1$ value ($Haze_2$–$Haze_1$), of 1–20%, determined according to ASTM D 1330 for a resin specimen of a thickness of 0.5 mm respectively after and before the specimen has been subjected to a heat sterilization treatment with steam at a temperature of 121° C. for 20 minutes, and
4) a high-speed impact strength of 1.5–10 J, determined by an impact test at 0° C. as the total rupture energy required for rupturing a resin specimen having a thickness of 0.5 mm, a length of 9 cm and a width of 9 cm, which has been subjected to a heat sterilization treatment with steam at 121° C. for 20 minutes and is then held at 0° C. for 2 hours, wherein the impact test is carried out by settling the specimen by fastening it on a jig having a hole of 1 inch diameter and causing a rush probe having a semispherical rush top of 0.5 inch diameter to impinge onto the specimen at an impingement speed of 3 m/sec.

(2) A hollow vessel for heat sterilization as defined in the above (1), wherein the average number of repeats of an impact test of sample vessels withstood to the test without causing rupture is at least 5, wherein the impact test is carried out by subjecting ten hollow vessels, each having an internal volume of 270 ml and a wall thickness of 0.5 mm obtained by blow molding, to a heat sterilization treatment with steam at 121° C. for 20 minutes, maintaining them at 0° C. for 24 hours after they are filled with water and then causing them repeatedly to fall on a floor from a height of 1.8 m.

(3) A hollow vessel for heat sterilization as defined in the above (1) or (2), wherein the polyolefin resin comprises
(A) a polypropylene resin,
(B) an ethylene/α-olefin random copolymer with the α-olefin having at least three carbon atoms, the said random copolymer having a content of the structural unit of ethylene of 60–95 mole %, a density of 0.86–0.94 g/cm³ and a melt flow rate, determined according to ASTM D 1238 at 190° C. under a load of 2.16 kg, of 0.01–50 g/10 min. and
(C) a propylene/ethylene/1-butene random copolymer which meets the three conditions 5) to 7) given below, namely,
condition 5) that it comprises 50–90 mole % of propylene unit, 2–30 mole % of ethylene unit and 8–40 mole % of 1-butene unit and that the content of 1-butene unit is greater than the content of ethylene unit;

condition 6) that it has a melt flow rate, determined according to ASTM D 1238 at 230° C. under a load of 2.16 kg, of 0.01–50 g/10 min.; and condition 7) that it has a molecular weight distribution expressed by Mw/Mn, determined by gel permeation chromatography (GPC), of 3 or less.

(4) A hollow vessel for heat sterilization made of a polyolefin resin composition comprising
(A) a polypropylene resin,
(B) an ethylene/α-olefin random copolymer with the α-olefin having at least three carbon atoms, the said random copolymer having a content of the structural unit of ethylene of 60–95 mole %, a density of 0.86–0.94 g/m³ and a melt flow rate, determined according to ASTM D 1238 at 190° C. under a load of 2.16 kg, of 0.01–50 g/10 min. and
(C) a propylene/ethylene/1-butene random copolymer which meets the three conditions 5) to 7) given below, namely, condition 5) that it comprises 50–90 mole % of propylene unit, 2–30 mole % of ethylene unit and 8–40 mole % of 1-butene unit and that the content of 1-butene unit is greater than the content of ethylene unit;

condition 6) that it has a melt flow rate, determined according to ASTM D 1238 at 230° C. under a load of 2.16 kg, of 0.01–50 g/10 min.; and condition 7) that it has a molecular weight distribution expressed by Mw/Mn, determined by gel permeation chromatography (GPC), of 3 or less.

(5) A hollow vessel for heat sterilization as defined in the above (3) or (4), wherein the polyolefin resin comprises 50–95 parts by weight of the polypropylene resin (A), 3–40 parts by weight of the ethylene/a -olefin random copolymer (B) and 2–30 parts by weight of the propylene/ethylene/1-butene random copolymer, with the amounts of (A), (B) and (C) summing up to 100 parts by weight.

(6) A hollow vessel for heat sterilization as defined in either one of the above (3) to (5), wherein the polypropylene resin (A) comprises at least one selected from the group consisting of propylene homopolymers, propylene/α-olefin random copolymers having a content of the α-olefin other than propylene of 10 mole % or less and propylene/α-olefin block-copolymers having a content of n-decane-extractable portion of 10% by weight or less.

(7) A hollow vessel for heat sterilization as defined in either one of the above (3) to (6), wherein the ethylene/α-olefin random copolymer (B) is obtained by a random copolymerization of ethylene and an α-olefin in the presence of a catalyst based on vanadium or based on metallocene.

(8) A hollow vessel for heat sterilization as defined in either one of the above (3) to (7), wherein the propylene/ethylene/1-butene random copolymer (C) is obtained by a random copolymerization of propylene, ethylene and 1-butene in the presence of a catalyst based on metallocene.

(9) A hollow vessel for heat sterilization as defined in the above (8), wherein the catalyst based on metallocene comprises a transition metal compound (a) of bridged type represented by the formula (1)

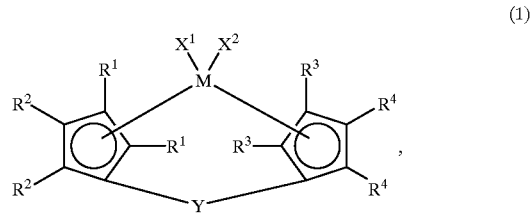

in which M denotes a transition metal atom of Groups IV . VIB of the periodic table; $R^1$, $R^2$, $R^3$ and $R^4$ represent each, identical with or different from each other, a hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group or may form a ring by combining a part of each of the groups adjoining each other together with the carbon atoms bound thereto; $X^1$ and $X^2$ stand each, identical with or different from each other, for hydrogen atom, a halogen atom, a hydrocarbyl of 1–20 carbon atoms, a halogenated hydrocarbyl of 1–20 carbon atoms or an oxygen- or sulfur-containing group; Y represents a divalent hydrocarbyl of 1–20 carbon atoms, a divalent halogenated hydrocarbyl of 1–20 carbon atoms, a divalent silisium- or germanium-containing group or stands for —O—, —CO—, —S—, —SO—, —SO$_2$—, —NR$^5$—, —P(R$^5$)—, —P(=O)(R$^5$)—, —BR$^5$— or —AlR$^5$— with $R^5$ being hydrogen atom, a halogen atom, a hydrocarbyl of 1–20 carbon atoms or a halogenated hydrocarbyl of 1–20 carbon atoms, and at least one compound capable of activating the above-identified transition metal compound (a) of bridged type and selected from the group consisting of (b) an organoaluminum compound, (c) an organoaluminum-oxy compound and (d) an ionizing ionic compound capable of forming an ion pair by reacting with the transition metal compound of bridge type represented by the above formula (1).

(10) A hollow vessel for heat sterilization as defined in either one of the above (1) to (9), wherein the vessel is one in which a food product is enclosed and is subjected to a steam sterilization.

(11) A hollow vessel for heat sterilization as claimed in either one of the above (1) to (9), wherein the vessel is one in which medical goods are enclosed and are subjected to a steam sterilization.

DETAILED DESCRIPTION OF THE INVENTION

In the context of this specification, the word "heat sterilization" does mean a technical procedure in which "the material to be sterilized is subjected to a heat treatment at a temperature of 85° C. or higher, preferably 100 to 125° C., in the presence of water, preferably in a form of steam, in order to cause sterilization". Likewise, the word "steam sterilization" means a technical procedure in which "the material to be sterilized is subjected to a complete heat sterilization by a saturated steam or a substantially saturated steam".

The polyolefin resin used as the material of the hollow vessel for sterilization according to the present invention has a characteristic feature that it has an underwater light transmittance, a tensile elastic modulus, a Δ Haze and a high-speed impact strength each within a specific range after it has been subjected to a steam sterilization treatment. According to the present invention, the condition for the steam sterilization treatment is settled to be at a temperature of 121° C. for a duration of 20 minutes and, under such a condition, the saturated steam has a pressure of 0.21 MPa and all existing bacteria and fungi are totally annihilated.

The polyolefin resin to be used as the material of the hollow vessel according to the present invention has an underwater light transmittance in the range from 70 to 99%, preferably from 75 to 99%, as determined by the method given in the following.

Thus, the underwater light transmittance of the polyolefin resin is determined by subjecting a specimen of the resin having a thickness of 0.5 mm to a steam sterilization at 121° C. for 20 minutes, immersing this specimen in water in the UV absorption spectrum detection cell of a spectrophotometer and detecting the transmitted light through the cell at a wave length of 450 nm, which is to be compared with the transmitted light through the cell filled with water without the resin specimen for the reference, whereupon the transmittance is calculated by the following equation:

$$\text{Underwater light transmittance}(\%) = \frac{(\text{Light transmission of the cell with the specimen})}{(\text{Light transmission of the reference cell})} \times 100$$

The polyolefin resin to be used as the material of the hollow vessel according to the present invention has a tensile elastic modulus in the range from 200 MPa to 700 MPa, preferably from 200 MPa to 500 MPa, as determined in the following manner:

A specimen of the polyolefin resin having a thickness of 0.5 mm is subjected to a steam sterilization treatment at 121° C. for 20 minutes, whereupon the tensile elastic modulus of the so-treated specimen is determined according to ASTM D 638.

The polyolefin resin to be used as the material of the hollow vessel according to the present invention has a Δ Haze in the range from 1 to 20%, preferably from 1 to 15%, as determined in the following manner:

A specimen of the polyolefin resin having a thickness of 0.5 mm is examined for its haze value according to ASTM D 1330 before ($Haze_1$) and after ($Haze_2$) the specimen is subjected to a steam sterilization treatment at 121° C. for 20 minutes, whereupon the difference between $Haze_1$ and $Haze_2$ ($Haze_2-Haze_1$) is calculated.

The polyolefin resin to be used as the material of the hollow vessel according to the present invention has a high-speed impact strength in the range from 1.5 to 10 Joules, preferably from 2 to 10 Joules, as determined at 0° C. as the total rupture energy required for rupturing a resin specimen in the following manner:

A specimen of the polyolefin resin having a thickness of 0.5 mm, a length of 9 cm and a width of 9 cm is subjected to a steam sterilization treatment at 121° C. for 20 minutes and is then held at 0° C. for 2 hours, whereupon the high-speed impact strength of the so-treated specimen is determined by settling the specimen on a jig having a hole of 1 inch diameter for receiving an impinging weight having an impact top of a diameter of 0.5 inch and causing the weight to impinge thereonto at an impingement speed of 3 m/sec.

The hollow vessel for heat sterilization according to the present invention should withstand to repeated impact tests up to at least five repeats, preferably at least 7 repeats, in average, without observing rupture, wherein the impact test is carried out by subjecting ten hollow vessel samples, each having an internal volume of 270 ml and a wall thickness of 0.5 mm obtained by blow molding, to a steam sterilization treatment at 121° C. for 20 minutes, maintaining them, after they are filled with water, at 0° C. for 24 hours and then causing them repeatedly to fall on a floor from a height of 1.8 m.

When the hollow vessel is produced from a polyolefin resin composition comprising the polypropylene resin (A), the ethylene/α-olefin random copolymer (B) and the propylene/ethylene/1-butene random copolymer (C), as defined above, the characteristic feature of the hollow vessel according to the present invention, namely, the underwater light transmittance, the tensile elastic modulus, the Δ Haze and the high-speed impact strength in the above-defined ranges after the vessel has been subjected to the steam sterilization, is attained.

The polypropylene resin (A) to be incorporated in the resin composition according to the present invention can be selected adequately from polypropylene resins known per se. For such polypropylene resin (A), there may be enumerated, for example, homopolymers of propylene and random copolymers and block copolymers of propylene with an α-olefin other than propylene. The polypropylene resin (A) may be modified with monomer(s) having polar group(s), such as maleic anhydride and so on.

The polypropylene resin (A) which is favorable includes homopolymers of propylene, propylene/α-olefin random copolymers having a content of the α-olefin unit, other than propylene unit, of 10 mole % or lower, preferably 8 mole % or lower, and propylene/α-olefin block copolymers having a n-decane-extractable portion of 10% by weight or less, preferably 8% by weight or less.

In the context of this specification, the "α-olefin unit" does mean a structural unit derived from the α-olefin and constituting the polymer. This applies also to ethylene unit, propylene unit, 1-butene unit and so on. The α-olefin as used according to the present invention includes also ethylene.

For the other α-olefins building up the propylene/α-olefin random copolymer or the propylene block copolymer according to the present invention, there may favorably be enumerated α-olefins having 2–20 carbon atoms other than propylene, concrete examples of which include ethylene, 1-butene, 1-pentene, 1-hexene, 1-heptene, 1-octene, 1-decene, 1-dodecene, 1-hexadecene and 4-methyl-1-pentene. These α-olefins may be incorporated either solely or in a combination of two or more of them.

The polypropylene resin (A) to be employed according to the present invention can be produced by processes known per se using a solid titanium catalyst or a metallocene catalyst known per se.

The polypropylene resin (A) may favorably have a degree of crystallinity, determined by X-ray diffraction method, of at least 40%, preferably at least 50%, and a melting point (Tm), determined by DSC method, in the range of 100–165° C. It is preferable to incorporate a polypropylene resin (A) having a melting point higher than those of the ethylene/α-olefin random copolymer (B) and of the propylene/ethylene/1-butene random copolymer (C).

The polypropylene resin (A) has usually a melt flow rate (MFR), determined in accordance with ASTM D 1238 at 230° C. under a load of 2.16 kg, in the range of 0.1–300 g/10 min., preferably 1–50 g/10 min.

The polypropylene resin (A) may be incorporated either alone or in a combination of two or more.

The ethylene/α-olefin random copolymer (B) to be used according to the present invention has a content of ethylene unit in the range from 60 to 95 mole %, preferably from 70 to 90 mole %, a density in the range from 0.86 to 0.94 g/cm$^3$, preferably from 0.87 to 0.93 g/cm$^3$, and an MFR (ASTM D 1238, 190° C., 2.16 kg load) in the range from 0.01 to 50 g/10 min., preferably from 0.1 to 30 g/10 min.

The number of carbon atoms of the α-olefin in the ethylene/α-olefin random copolymer (B) is 3 or more, preferably 3–20. As concrete examples of the α-olefin, there may be enumerated propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. They may be incorporated either solely or in a combination of two or more of them.

By compounding the ethylene/α-olefin random copolymer (B) as above and the propylene/ethylene/1-butene random copolymer (C) with the polypropylene resin (A), the resulting hollow vessel according to the present invention is superior in the transparency and in the impact resistance with scarce emission of any smell and with better preservation of these superior characteristics, especially transparency, even after it has been subjected to a steam sterilization treatment.

It is favorable that the ethylene/α-olefin random copolymer (B) has a molecular weight distribution expressed by Mw/Mn (weight-average molecular weight/number-average molecular weight) of 3 or less, converted into the molecular weight of a standard monodisperse polystyrene used for preparing the calibration curve in the determination by gel-permeation chromatography (GPC) using o-dichlorobenzene as the elution solvent and using monodisperse polystyrenes as the standard and has a degree of crystallinity, determined by X-ray diffraction method, of, preferably, lower than 40%, more preferably not higher than 30%. By using such an ethylene/α-olefin random copolymer (B), a hollow vessel which is more superior in the impact resistance is obtained.

The ethylene/α-olefin random copolymer (B) may favorably have an intrinsic viscosity [η], determined in decalin (decahydronaphthalene) at 135° C., in the range of 0.5–5.0 dl/g and a gη*-value exceeding 0.95.

The gη*-value is defined by the following equation.

$$g\eta^* = [\eta]/[\eta]_{blank}$$

[in which [η] represents the intrinsic viscosity determined as above and [η]$_{blank}$ denotes the intrinsic viscosity of a linear chain ethylene/propylene random copolymer having an ethylene content of 70 mole % and the same weight-average molecular weight (by light scattering method) as that of the ethylene/α-olefin random copolymer of the intrinsic viscosity [η] mentioned above.

By using an ethylene/α-olefin random copolymer (B) having the above characteristic features, the resulting hollow vessel for heat sterilization will be superior in the mechanical strength, weatherability, ozone-resistance, low temperature flexibility and heat resistance.

As the ethylene/α-olefin random copolymer (B), those which are obtained by co-polymerizing ethylene with an α-olefin having three or more carbon atoms in the presence of a known catalyst based on Ziegler's one, based on vanadium or based on metallocene are preferred.

Preferable catalyst based on vanadium to be employed in producing the ethylene/α-olefin random copolymer (B) may favorably be composed of a soluble vanadium compound and an alkylaluminum halide. Preferable catalyst based on metallocene may favorably be composed of a zirconium-containing metallocene and an alkylaluminum-oxy compound.

As the soluble vanadium compound of the vanadium-based compound to be used for producing the ethylene/α-olefin random copolymer (B), there may be exemplified concretely vanadium tetrachloride, vanadium oxytrichloride, vanadium monoethoxydichloride, vanadium triacetylacetonate, oxyvanadium triacetyl-acetonate and so on.

As the alkylaluminum halide of the catalyst based on vanadium, there may be exemplified concretely ethylaluminum dichloride, diethylaluminum monochloride, ethylaluminum sesquichloride, diethylaluminum monobromide, diisobutylaluminum monochloride, isobutylaluminum dichloride, isobutylaluminum sesquichloride and so on.

As the catalyst based on metallocene to be used for producing the ethylene/α-olefin random copolymer (B), there may concretely be enumerated ethylene bis(indenyl) zirconium dibromide, dimethylsililene bis(2-methylindenyl) zirconium dichloride, bis(cyclopentadienyl)zirconium dibromide, bis(dimethylcyclopentadienyl)zirconium dichloride and so on.

As the organoaluminum-oxy compound of the catalyst based on metallocene, there may be exemplified aluminoxanes and organoaluminum-oxy compounds insoluble in benzene.

The metallocene-based catalyst may contain an organoaluminum compound together with a metallocene and an organoaluminum-oxy compound. Concrete examples include triisobutylaluminum, dimethylaluminum chloride and methylaluminum sesquichloride.

The copolymerization of ethylene with an α-olefin having three or more carbon atoms using the catalyst based on vanadium or based on metallocene as give above can be performed in a solution, suspension or in an intermediate state between them, wherein in every case an inert solvent may preferably be employed for the reaction medium.

As mentioned previously, the propylene/ethylene/1-butene random copolymer (C) to be used according to the present invention meets the conditions 5) to 7) given previously. These conditions are described below in order.

By the condition 5), the chemical composition of the propylene/ethylene/1-butene random copolymer (C) is specified.

Thus, the propylene/ethylene/1-butene random copolymer (C) should comprise 50–90 mole %, preferably 60–87 mole %, of the propylene unit, 2–30 mole %, preferably 3–20 mole %, of the ethylene unit and 8–40 mole %, preferably 10–30 mole %, of the 1-butene unit. Here, the content of the 1-butene unit should be greater than that of the ethylene unit.

By adjusting the chemical composition of the propylene/ethylene/1-butene random copolymer (C) to the above proportion, the copolymer (C) will have a better balance between the elastomeric property and the compatibilities of the copolymer (C) with the polypropylene resin (A) and with the ethylene/α-olefin random copolymer (B).

The propylene/ethylene/1-butene random copolymer (C) may contain further α-olefin unit(s) other than the propylene unit, the 1-butene unit and the ethylene unit in a small proportion within a limit not obstructing the advantageous feature mentioned above, such as for example, 10 mole % or less.

The conditions 6) and 7) prescribe the melt flow rate (MFR) as an index for the molecular weight and the molecular weight distribution (Mw/Mn), respectively, of the propylene/ethylene/1-butene random copolymer (C).

The MFR (ASTM D 1238, 230° C., 2.16 kg load) of the propylene/ethylene/1-butenerandom copolymer (C) is in the range of 0.01–50 g/10 min., preferably 0.1–30 g/10 min.

The Mw/Mn ratio of the random copolymer (C) is not higher than 3, preferably in the range from 1.8 to 3.0. The Mw/Mn ratio is a value converted into a polystyrene-based value determined by the gel permeation chromatography (GPC) using o-dichlorobenzene as the elution solvent and using monodisperse polystyrenes as the standard.

The molecular weight distribution expressed by Mw/Mn can be determined by a method as given below using, for example, the apparatus of Model GPC-150C of the firm Water. Thus, the gel-permeation chromatography is performed using a separation column TSK GNH TH (with a diameter of 7.8 mm and a length of 600 mm) and a mobile phase of o-dichlorobenzene with addition of 0.025% by weight of BHT as an antioxidant and passing this eluent to the column at a temperature of 140° C. at a flow rate of 1.0 ml/min. The column is charged with 500 µl of the sample at a concentration of 0.1% by weight. For the detector, a differential refractometer may be employed. As the standard polystyrenes, for example, products of the firm Toso may be employed.

When the propylene/ethylene/1-butene random copolymer (C) has an MFR and a molecular weight distribution within the above-indicated ranges, it has a superior compatibility with the polypropylene resin (A) and the resin composition containing such random copolymer (C) will exhibit better processibility upon molding with the resulting molded product which is superior in the transparency with scarce surface tuckiness and which preserves these characteristic features, especially the transparency even after having been subjected to a heat sterilization treatment.

For the propylene/ethylene/1-butene random copolymer (C) to be employed according to the present invention, one which has a specific microstructure is preferred.

Thus, the propylene/ethylene/1-butene random copolymer (C) may preferably contain i) a three-membered chain structure constituted exclusively of propylene unit with head-to-tail coupling or ii) a three-membered chain structure constituted of propylene units with head-to-tail coupling and 1-butene unit. Among those having the three-membered chain structures i) and ii), such ones are preferred, in which the $^{13}$C-NMR observation (in a hexachlorobutadiene solution, with reference to tetramethylsilane) for the side chain methyl group of the second propylene unit in the three-membered chain structure i) and ii) will show the integrated areas for the peaks found within the range of 21.2–21.7 ppm amounting at least 90%, preferably 92% or more, of the integrated areas of the total peaks which appear within the range of 19.7–21.7 ppm and which are assumed to be 100%.

For the propylene/ethylene/1-butene random copolymer (C), those in which the proportion of the site-irregular units caused by 2,1-insertion of propylene monomer, determined by $^{13}$C-NMR, is at least 0.05%, preferably 0.05–0.4%, more preferably 0.05–0.3%, of the total propylene units are favorable.

For the propylene/ethylene/1-butene random copolymer (C), it is preferable that the proportion of the site-irregular units caused by 1,3-insertion of propylene monomer is not higher than 0.05%. Upon the polymerization, propylene monomer will be incorporated by 1,2-insertion (the methylene side will combine with the catalyst as described afterwards), while in a rare case it may be incorporated by 2,1-insertion or 1,3-insertion. The propylene monomers incorporated by the 2,1-insertion or by the 1,3-insertion constitute site-irregular units in the polymer chain.

The proportion of 2,1-insertion of propylene monomers in the entire propylene units can be determined using $^{13}$C-NMR by reference to the disclosure of "Polymer", 30, (1989) 1350 from the following mathematical equation (I):

[Proportion of site-irregular units due to 2,1-insertion]= [[0.25.Iαβ.{Struct.(i)}+0.5.Iαβ.{Struct.(ii)}]×100]÷[Iαα+ Iαβ.{Struct.(ii)}+0.5.[Iαγ+Iαβ.{(Struct.(i)}+Iαδ]]    (I)

Here, the nomenclature for the peaks is in accordance with the method of Carman et al: "Rubber Chem. Technol.", 44, (1971), 781. The symbols Iαβ etc. refer to the integrated peak area for the αβ peak etc. When the integrated area for a peak is difficult to measure directly from the spectrum chart due to reasons, such as overlapping and the like, a carbon peak having corresponding area may be substituted therefor.

The proportion of the three-membered chain structure caused by the 1,3-insertion of propylene in per cent value can be calculated by dividing ½ of the area of βγ peak (resonating at around 27.4 ppm) by the sum of the total peaks of methyl groups plus ½ of the βγ peak and multiplying the resulting quotient by 100.

For the propylene/ethylene/1-butene random copolymer (C) to be used according to the present invention, preference is given for those which are produced using a metallocene catalyst, especially those which are produced using the metallocene catalyst as described in the following.

As the metallocene-based catalyst to be used for producing the propylene/ethylene/1-butene random copolymer (C) especially favorably, those based on metallocene are preferred, which comprise (a) a transition metal compound of bridged type (in the following, denoted sometimes simply as a transition metal compound) represented by the formula (1) given below and at least one compound which is capable of activating the above-identified transition metal compound of bridged type (a) and is selected from the group consisting of (b) an organoaluminum compound, (c) an organoaluminum-oxy compound and (d) an ionizing ionic compound capable of forming an ion pair by reacting with the transition metal compound (a).

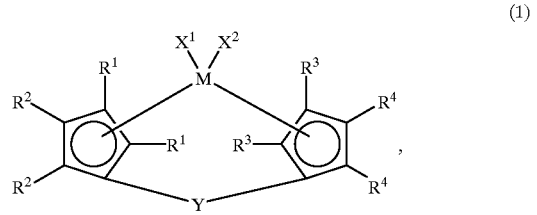

(1)

in which M denotes a transition metal atom of Groups IV–VIB of the periodic table; $R^1$, $R^2$, $R^3$ and $R^4$ represent each, identical with or different from each other, a hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group or may form a ring by combining a part of each of the groups adjoining each other together with the carbon atoms bound thereto; $X^1$ and $X^2$ stand each, identical with or different from each other, for hydrogen atom, a halogen atom, a hydrocarbyl of 1–20 carbon atoms, a halogenated hydrocarbyl of 1–20 carbon atoms or an oxygen- or sulfur-containing group; Y represents a divalent hydrocarbyl of 1–20 carbon atoms, a divalent halogenated hydrocarbyl of 1–20 carbon atoms, a divalent silisium- or germanium-containing group or stands for —O—, —CO—, —S—, —SO—, —SO$_2$—, —NR$^5$—, —P(R$^5$)—, —P(=O)(R$^5$)—, —BR$_5$— or —AlR$^5$— with R$^5$ being hydrogen atom, a halogen atom, a hydrocarbyl of 1–20 carbon atoms or a halogenated hydrocarbyl of 1–20 carbon atoms.

In the formula (1), M represents a transition metal of Group IV–VIB of the periodic table, concrete examples thereof include titanium, zirconium, hafnium, vanadium, niobium, tantalum, chromium, milybdenum and wolfram, wherein preference is given to titanium, zirconium and hafnium with particular preference to zirconium.

In the formula (1), $R^1$, $R^2$, $R^3$ and $R^4$ may be identical with or different from each other and stand each for hydrogen atom, a halogen atom, a hydrocarbon group which may be substituted by halogen, a silicium-, oxygen-, sulfur-, nitrogen- or phosphorus-containing group or may form a ring by combining a part of each of the adjoining groups together with the carbon atoms bound thereto. In the formula (1), the groups $R^1$ to $R^4$ given each doubly suggest that it is preferable that the two of the same symbol will be coupled together when a ring is formed from them. Thus, a ring may preferably be formed from, for example, two $R^1$ groups by being bound together.

As the halogen atom represented by $R^1$–$R^4$ in the formula (1), there may be exemplified fluorine, chlorine, bromine or iodine.

As the hydrocarbyl of 1–20 carbon atoms represented by $R^1$–$R^4$ in the formula (1), there may be enumerated, for example, alkyl groups, such as methyl, ethyl, n-propyl, isopropyl, n-butyl, isobutyl, sec-butyl, tert-butyl, n-pentyl, neopentyl, n-hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- and β-naphthyls, methylnaphthyl, anthracenyl, phenanthryl, benzylphenyl, pyrenyl, acenaphthyl, phenalenyl, aceanthrylenyl, tetrahydronaphthyl, indanyl and biphenylyl.

As the ring to be formed by combining these hydrocarbyl groups, there may be enumerated, for example, fused rings, such as benzene ring, naphthalene ring, acenaphthene ring and indene ring; and ring groups in which hydrogen atom(s) on a fused ring, such as benzene ring, naphthalene ring acenaphthene ring or indene ring, are substituted by an alkyl group, such as methyl, ethyl, propyl or butyl. These hydrocarbyl groups may be substituted by halogen(s).

The silicium-containing group represented by $R^1$–$R^4$ in the formula (1) may stand for a hydrocarbyl-monosubstituted silyl, such as methylsilyl or phenylsilyl; a hydrocarbyl-disubstituted silyl, such as dimethylsilyl or diphenylsilyl; a hydrocarbyl-trisubstituted silyl, such as trimethylsilyl, triethylsilyl, tripropylsilyl, tricyclohexylsilyl, triphenylsilyl, dimethylphenylsilyl, methyldiphenylsilyl, tritolylsilyl or trinaphthylsilyl; a silyl ether of a hydrocarbyl-substituted silyl, such as trimethylsilyl ether; a silicium-substituted alkyl, such as trimethylsilylmethyl; and a silicium-substituted aryl, such as trimethylsilylphenyl.

As the oxygen-containing group represented by $R^1$–$R^4$ in the formula (1), there may be enumerated, for example, hydroxy; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

As the sulfur-containing groups represented by $R^1$–$R^4$ in the formula (1), there may be enumerated, for example, those in which the oxygen atom in the above-mentioned oxygen-containing groups is replaced by sulfur and sulfonate groups, such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate and pentafluorobenzene sulfonate; and sulfinate groups, such as methyl sulfinate, phenyl sulfinate, benzene sulfinate, p-toluene sulfinate, trimethylbenzene sulfinate and pentafluorobenzene sulfinate.

As the nitrogen-containing groups represented by $R^1$–$R^4$ in the formula (1), there may be enumerated, for example, amino group; alkylamino groups, such as methylamino, dimethylamino, diethylamino, dipropylamino, dibutylamino and dicyclohexylamino; arylamino and alkylarylamino groups, such as phenylamino, diphenylamino, ditolylamino, dinaphthylamino and methylphenylamino.

As the phosphorus-containing groups represented by $R^1$–$R^4$ in the formula (1), there may be exemplified dimethylphosphino and diphenylphosphino.

In the formula (1), $X^1$ and $X^2$ may be identical with or different from each other and may stand each for hydrogen atom, a halogen atom, a hydrocarbyl which may be substituted by halogen(s) of 1–20 carbon atoms or an oxygen- or sulfur-containing group. As the atoms or the groups for them, there may concretely be enumerated those which are given for the atoms or the groups for $R^1$–$R^4$.

In the formula (1), Y represents a divalent hydrocarbyl group which may be substituted by halogen(s) of 1–20 carbon atoms, a divalent silicium-containing group, a divalent germanium-containing group, —O—, —CO—, —S—, —SO—, —SO$_2$—, —NR$^5$—, —P(R$^5$)—, —P(O)(R$^5$)—, —BR$^5$— or —AlR$^5$— with R$^5$ being hydrogen atom, a halogen atom, a hydrocarbyl of 1–20 carbon atoms which may be substituted by halogen(s).

As the hydrocarbyl of 1–20 carbon atoms which may be substituted by halogen(s) as represented by Y in the formula (1), there may be exemplified alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene. There may further be enumerated halogenated hydrocarbyl groups, such as those in which the divalent hydrocarbyl of 1–20 carbon atoms given above are halogenated.

As the divalent silicium-containing groups represented by Y in the formula (1), there may be exemplified alkylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; alkylarylsilylenes; arylsilylenes; alkyldisilyls, such as tetramethyl-1,2-disilyl and tetraphenyl-1,2-disilyl; alkylaryldisilyls and aryldisilyls.

As the germanium-containing groups represented by Y in the formula (1), there may be exemplified those in which the silicium atom of the silicium-containing divalent groups given above is replaced by germanium atom.

In the following, concrete examples of the transition metal compound of bridged type (a) represented by the formula (1) are given:

Bis(cyclopentadienyl)zirconium dichloride, bis(indenyl)zirconium dichloride, bis(fluorenyl)zirconium dichloride, bis(n-propylcyclopentadienyl)zirconium dichloride, bis(t-butylcyclopentadienyl)zirconium dichloride, bis(trimethylsilylcyclopentadienyl)zirconium dichloride, bis(neopentylcyclopentadienyl)zirconium dichloride, rac-dimethylsilylene-bis(1-cyclopentadienyl)-zirconium dichloride, rac-dimethylsilylene-bis{1-(3-methylcyclopentadienyl)}zirconium dichloride, rac-dimethylsilylene-bis{1-(2,4-dimethylcyclopentadienyl)}zirconium dichloride, rac-dimethylsilylene-bis{1-(2,3,5-trimethylcyclopentadienyl)}zirconium dichloride and so on.

According to the present invention, among the transition metal compound (a) represented by the formula (1), those bridged type compounds represented by the following formula (2) are used favorably.

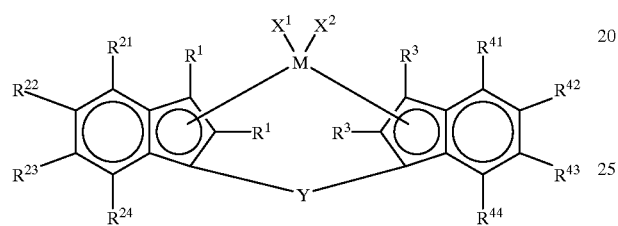

(2)

In the formula (2), M, $R^1$, $R^3$, $X^1$, $X^2$ and Y have the same meanings as defined for the formula (1) and $R^{21}$ to $R^{24}$ and $R^{41}$ to $R^{44}$ represent each hydrogen atom, a halogen atom, an alkyl group or an aryl group, wherein the alkyl and aryl groups may be substituted by halogen atom(s) or by organosilyl group(s).

In the following, concrete examples of the transition metal compound of bridged type represented by the formula (2) are given:

rac-dimethylsilylene-bis[1-{2-n-propyl-4-(9-phenanthryl)indenyl}]zirconium dichloride,
rac-ethylene-bis(1-indenyl)zirconium dichloride,
rac-ethylene-bis(1-indenyl)zirconium dibromide,
rac-ethylene-bis(1-indenyl)dimethylzirconium,
rac-ethylene-bis(1-indenyl)diphenylzirconium,
rac-ethylene-bis(1-indenyl)methylzirconium monochloride,
rac-ethylene-bis(1-indenyl)zirconium-bis(methanesufonate),
rac-ethylene-bis(1-indenyl)zirconium-bis(p-toluenesufonate),
rac-ethylene-bis(1-indenyl)zirconium-bis(trifluoromethanesulfonate),
rac-ethylene-bis{1-(4,5,6,7-tetrahydroindenyl)}-zirconium dichloride,
rac-isopropylidene-bis{1-indenyl)}zirconium dichloride,
rac-dimethylsilylene-bis(1-indenyl)zirconium dichloride,
rac-dimethylsilylene-bis{1-(2-methylindenyl)}-zirconium dichloride,
rac-dimethylsilylene-bis{1-(2-methyl-4-i-propylindenyl)}zirconium dichloride,
rac-dimethylsilylene-bis{1-(2,7-dimethyl-4-ethylindenyl)}zirconium dichloride,
rac-dimethylsilylene-bis{1-(2,7-dimethyl-4-n-propylindenyl)}zirconium dichloride,
rac-dimethylsilylene-bis{1-(2,7-dimethyl-4-i-propylindenyl)}zirconium dichloride,
rac-dimethylsilylene-bis{1-(2,7-dimethyl-4-n-butylindenyl)}zirconium dichloride,
rac-dimethylsilylene-bis{1-(2,7-dimethyl-4-secbutylindenyl)}zirconium dichloride,
rac-dimethylsilylene-bis{1-(2,7-dimethyl-4-t-butylindenyl)}zirconium dichloride,
rac-dimethylsilylene-bis{1-(2,7-dimethyl-4-n-pentylindenyl)}zirconium dichloride,
rac-dimethylsilylene-bis{1-(2,7-di-methyl-4-n-hexylindenyl)}zirconium dichloride,
rac-dimethylsilylene-bis{1-(2,7-dimethyl-4-cyclohexylindenyl)}zirconium dichloride,
rac-dimethylsilylene-bis{1-(2,7-dimethyl-4-methylcyclohexylindenyl)}zirconium dichloride,
rac-dimethylsilylene-bis{1-(2,7-dimethyl-4-phenylethylindenyl)}zirconium dichloride,
rac-dimethylsilylene-bis{1-(2,7-dimethyl-4-phenyldichloromethylindenyl)}zirconium dichloride,
rac-dimethylsilylene-bis{1-(2,7-dimethyl-4-chloromethylindenyl)}zirconium dichloride,
rac-dimethylsilylene-bis{1-(2,7-dimethyl-4-trimethylsilylenemethylindenyl)}zirconium dichloride,
rac-dimethylsilylene-bis{1-(2,7-dimethyl-4-trimethylsiloxymethylindenyl)}zirconium dichloride,
rac-diethylsilylene-bis{1-(2,7-dimethyl-4-i-propylindenyl)}zirconium dichloride,
rac-di(i-propyl)silylene-bis{1-(2,7-dimethyl-4-i-propylindenyl)}zirconium dichloride,
rac-di(n-butyl)silylene-bis{1-(2,7-dimethyl-4-i-propylindenyl)}zirconium dichloride,
rac-di(cyclohexyl)silylene-bis{1-(2,7-dimethyl-4-i-propylindenyl)}zirconium dichloride,
rac-methylphenylsilylene-bis{1-(2,7-dimethyl-4-i-propylindenyl)}zirconium dichloride,
rac-methylphenylsilylene-bis{1-(2,7-dimethyl-4-t-butylindenyl)}zirconium dichloride,
rac-diphenylsilylene-bis{1-(2,7-dimethyl-4-t-butylindenyl)}zirconium dichloride,
rac-diphenylsilylene-bis{1-(2,7-dimethyl-4-i-propylindenyl)}zirconium dichloride,
rac-diphenylsilylene-bis{1-(2,7-dimethyl-4-ethylindenyl)}zirconium dichloride,
rac-di(p-tolyl)silylene-bis{1-(2,7-dimethyl-4-i-propylindenyl)}zirconium dichloride,
rac-di(p-chlorophenyl)silylene-bis{1-(2,7-dimethyl-4-i-propylindenyl)}zirconium dichloride,
rac-dimethylsilylene-bis{1-(2-methyl-4-i-propyl-7-ethylindenyl)}zirconium dichloride,
rac-dimethylsilylene-bis{1-(2,7-dimethyl-4-i-propyl-1-indenyl)zirconium dimethyl,
rac-dimethylsilylene-bis{1-(2,7-dimethyl-4-i-propyl-1-indenyl)zirconiummethyl chloride,
rac-dimethylsilylene-bis{1-(2,7-dimethyl-4-i-propyl-1-indenyl)zirconium-bis{1-(trifluoromethanesulfonate),
rac-dimethylsilylene-bis{1-(2,7-dimethyl-4-i-propyl-1-indenyl)zirconium-bis{1-(p-phenylsulfinate),
rac-dimethylsilylene-bis{1-(2-phenyl-4-i-propyl-7-methyl-1-indenyl)zirconium dichloride,
rac-dimethylsilylene-bis(1,2-dihydroacenaphthylo-(4,5-b)cyclopentadienyl)zirconium dichloride,
rac-dimethylsilylene-bis(benzo(e)indenyl)-zirconium chloride, rac-dimethylsilylene-bis{1-(4-phenylindenyl)}-zirconium dichloride,
rac-dimethylsilylene-bis{1-(2-methyl-4-phenyl-indenyl)}zirconium dichloride,
rac-dimethylsilylene-bis(1-{2-methyl-4-(α-naphthyl)indenyl})zirconium dichloride,
rac-dimethylsilylene-bis(1-{2-methyl-4-(β-naphthyl)indenyl})zirconium dichloride,
rac-dimethylsilylene-bis(1-{2-methyl-4-(1-anthracenyl)indenyl})zirconium dichloride,
rac-dimethylsilylene-bis(1-{2-methyl-4-(2-anthracenyl)indenyl})zirconium dichloride,
rac-dimethylsilylene-bis(1-{2-methyl-4-(9-anthracenyl)indenyl})zirconium dichloride,
rac-dimethylsilylene-bis(1-{2-methyl-4-(9-phenanthryl)indenyl})zirconium dichloride,
rac-dimethylsilylene-bis(1-{2-methyl-4-(p-fluorophenyl)indenyl})zirconium dichloride,
rac-dimethylsilylene-bis(1-{2-methyl-4-(pentafluorophenyl)indenyl}]zirconium dichloride,
rac-dimethylsilylene-bis(1-{2-methyl-4-(p-chlorophenyl)indenyl})zirconium dichloride,
rac-dimethylsilylene-bis(1-{2-methyl-4-(m-chlorophenyl)indenyl})zirconium dichloride,
rac-dimethylsilylene-bis(1-{2-methyl-4-(o-chlorophenyl)indenyl})zirconium dichloride,
rac-dimethylsilylene-bis(1-{2-methyl-4-(o,p-dichlorophenyl)phenyl-1-indenyl})zirconium dichloride,
rac-dimethylsilylene-bis(1-{2-methyl-4-(p-bromophenyl)indenyl})zirconium dichloride,
rac-dimethylsilylene-bis(1-{2-methyl-4-(p-tolyl)-indenyl})zirconium dichloride,
rac-dimethylsilylene-bis(1-{2-methyl-4-(m-tolyl)indenyl})zirconium dichloride,
rac-dimethylsilylene-bis(1-{2-methyl-4-(o-tolyl)indenyl})zirconium dichloride,
rac-dimethylsilylene-bis(1-{2-methyl-4-(o,o'-dimethylphenyl)-1-indenyl})zirconium dichloride,
rac-dimethylsilylene-bis(1-{2-methy1-4-(p-ethyl-phenyl)indenyl})zirconium dichloride,
rac-dimethylsilylene-bis(1-{2-methyl-4-(p-i-propylphenyl)indenyl})zirconium dichloride,
rac-dimethylsilylene-bis(1-{2-methyl-4-(p-benzylphenyl)indenyl})zirconium dichloride,
rac-dimethylsilylene-bis(1-{2-methyl-4-(p-biphenyl)indenyl})zirconium dichloride,
rac-dimethylsilylene-bis(1-(2-methyl-4-(m-biphenyl)indenyl})zirconium dichloride,
rac-dimethylsilylene-bis(1-{2-methyl-4-(p-trimethylsilylene)phenyl)indenyl})zirconium dichloride,
rac-dimethylsilylene-bis(1-{2-methyl-4-(m-trimethylsilylenephenyl)indenyl})zirconium dichloride,
rac-dimethylsilylene-bis(2-phenyl-4-phenylindenyl)}zirconium dichloride,
rac-dimethylsilylene-bis{1-(2-methyl-4-phenylindenyl)}zirconium dichloride,
rac-dimethylsilylene-bis{1-(2-methyl-4-phenylindenyl)}zirconium dimethyl,
rac-dimethylsilylene-bis{1-(2-methyl-4-phenylindenyl)}zirconium methyl chloride,
rac-dimethylsilylene-bis{1-(2-methyl-4-phenylindenyl)}zirconium chloride SO₂Me,
rac-dimethylsilylene-bis{1-(2-methyl-4-phenylindenyl)}zirconium chloride OSO₂Me,
rac-dimethylsilylene-bis{1-(2-methyl-4-phenylindenyl)}zirconium monochloride mono(trifluoromethanesulfonate),
rac-dimethylsilylene-bis{1-(2-methyl-4-phenylindenyl)}zirconium di(trifluoromethanesulfonate),
rac-dimethylsilylene-bis{1-(2-methyl-4-phenylindenyl)}zirconium di(p-toluenesulfonate),
rac-dimethylsilylene-bis{1-(2-methyl-4-phenylindenyl)}zirconium di(methylsulfonate),
rac-dimethylsilylene-bis{1-(2-methyl-4-phenylindenyl)}zirconium di(trifluoromethane sulfinate),
rac-dimethylsilylene-bis{1-(2-methyl-4-phenylindenyl)}zirconium di(trifluoroacetate),
rac-dimethylsilylene-bis{1-(2-methyl-4-phenylindenyl)}zirconium monochloride (n-butoxide),
rac-dimethylsilylene-bis{1-(2-methyl-4-phenylindenyl)}zirconium di(butoxide),
rac-dimethylsilylene-bis{1-(2-methyl-4-phenylindenyl)}zirconium monochloride(phenoxide),
rac-methylene-bis{1-(2-methyl-4-phenylindenyl)}-zirconium dichloride,
rac-ethylene-bis{1-(2-methyl-4-phenylindenyl)}-zirconium dichloride,
rac-di(i-propyl)silylene-bis{1-(2-methyl-4-phenylindenyl)}zirconium dichloride,
rac-di(n-butyl)silylene-bis{1-(2-methyl-4-phenylindenyl)}zirconium dichloride,
rac-dicyclohexylsilylene-bis{1-(2-methyl-4-phenylindenyl)}zirconium dichloride,
rac-methylphenylsilylene-bis{1-(2-methyl-4-phenylindenyl)}zirconium dichloride,
rac-diphenylsilylene-bis{1-(2-methyl-4-phenylindenyl)}zirconium dichloride,
rac-di(p-tolyl)silylene-bis{1-(2-methyl-4-phenylindenyl)}zirconium dichloride,
rac-di(p-chlorophenyl)silylene-bis{1-(2-methyl-4-phenylindenyl)}zirconium dichloride,
rac-dimethylgermylene-bis{1-(2-methyl-4-phenylindenyl)}zirconium dichloride,
rac-dimethylstannylene-bis{1-(2-methyl-4-phenylindenyl)}zirconium dichloride,
rac-dimethylsilylene-bis{1-(2-ethyl-4-phenylindenyl)}zirconium dichloride,
rac-dimethylsilylene-bis(1-{2-ethyl-4-(α-naphthyl)indenyl})zirconium dichloride,
rac-dimethylsilylene-bis(1-{2-ethyl-4-(β-naphthyl)indenyl})zirconium dichloride,
rac-dimethylsilylene-bis(1-{2-ethyl-4-(2-methyl-1-naphthyl)indenyl})ziconium dichloride,
rac-dimethylsilylene-bis(1-{2-ethyl-4-(5-acenaphthyl)indenyl})zirconium dichloride,
rac-dimethylsilylene-bis(1-{2-ethyl-4-(9-anthracenyl)indenyl})ziconium dichloride,
rac-dimethylsilylene-bis(1-{2-ethyl-4-(9-phenanthryl)indenyl})zirconium dichloride,
rac-dimethylsilylene-bis(1-{2-ethyl-4-(o-methylphenyl)indenyl})zirconium dichloride,
rac-dimethylsilylene-bis(1-{2-ethyl-4-(m-methylphenyl)indenyl})zirconium dichloride,
rac-dimethylsilylene-bis(1-{2-ethyl-4-(p-methylphenyl)indenylenyl})zirconium dichloride, rac-dimethylsilylene-bis(1-{2-ethyl-4-(2,3-dimethylphenyl)indenyl})zirconium dichloride,
rac-dimethylsilylene-bis(1-{2-ethyl-4-(2,4-dimethylphenyl)indenyl})zirconium dichloride,
rac-dimethylsilylene-bis(1-{2-ethyl-4-(2,5-dimethylphenyl)indenyl})zirconium dichloride,
rac-dimethylsilylene-bis(1-f2-ethyl-4-(2,4,6-trimethylphenyl)indenyl})zirconium dichloride,
rac-dimethylsilylene-bis(1-{2-ethyl-4-(o-chlorophenyl)indenyl})zirconium dichloride,
rac-dimethylsilylene-bis(1-{2-ethyl-4-(m-chlorophenyl)indenyl})zirconium dichloride,
rac-dimethylsilylene-bis(1-{2-ethyl-4-(p-chlorophenyl)indenyl})zirconium dichloride,
rac-dimethylsilylene-bis(1-{2-ethyl-4-(2,3-dichlorophenyl)indenyl})zirconium dichloride,
rac-dimethylsilylene-bis(1-{2-ethyl-4-(2,6-dichlorophenyl)indenyl})zirconium dichloride,
rac-dimethylsilylene-bis(1-{2-ethyl-4-(3,5-dichlorophenyl)indenyl})zirconium dichloride,
rac-dimethylsilylene-bis(1-{2-ethyl-4-(2-bromophenyl)indenyl})zirconium dichloride,
rac-dimethylsilylene-bis(1-{2-ethyl-4-(3-bromophenyl)indenyl})zirconium dichloride,
rac-dimethylsilylene-bis(1-{2-ethyl-4-(4-bromophenyl)indenyl})zirconium dichloride,
rac-dimethylsilylene-bis(1-{2-ethyl-4-(4-biphenylyl)indenyl})zirconium dichloride,
rac-dimethylsilylene-bis(1-{2-ethyl-4-(4-trimethylsilylenephenyl)indenyl})zirconium dichloride,
rac-dimethylsilylene-bis{1-(2-n-propyl-4-phenylindenyl)}zirconium dichloride,
rac-dimethylsilylene-bis(1-{2-n-propyl-4-(α-naphthyl)indenyl})zirconium dichloride,
rac-dimethylsilylene-bis(1-{2-n-propyl-4-(β-naphthyl)indenyl})zirconium dichloride,
rac-dimethylsilylene-bis(1-{2-n-propyl-4-(2-methyl-1-naphthyl)indenyl})zirconium dichloride,
rac-dimethylsilylene-bis(1-{2-n-propyl-4-(5-acenaphthyl)indenyl})zirconium dichloride,
rac-dimethylsilylene-bis(1-{2-n-propyl-4-(9-anthracenyl)indenyl})zirconium dichloride,
rac-dimethylsilylene-bis(1-{2-n-propyl-4-(9-phenanthryl)indenyl})zirconium dichloride,
rac-dimethylsilylene-bis{1-(2-i-propyl-4-phenylindenyl)}zirconium dichloride,
rac-dimethylsilylene-bis(1-{2-i-propyl-4-(α-naphthyl)indenyl})zirconium dichloride,
rac-dimethylsilylene-bis(1-(2-i-propyl-4-(β-naphthyl)indenyl})zirconium dichloride,
rac-dimethylsilylene-bis(1-{2-i-propyl-4-(2-methyl-1-napthyl)indenyl})zirconium dichloride,
rac-dimethylsilylene-bis(1-{2-i-propyl-4-(5-acenaphthyl)indenyl})zirconium dichloride,
rac-dimethylsilylene-bis(1-{2-i-propyl-4-(9-anthracenyl)indenyl})zirconium dichloride,
rac-dimethylsilylene-bis(1-{2-i-propyl-4-(9-phenanthryl)indenyl})zirconium dichloride,
rac-dimethylsilylene-bis{1-(2-s-butyl-4-phenylindenyl)}zirconium dichloride,
rac-dimethylsilylene-bis(1-{2-s-butyl-4-(α-naphthyl)indenyl)}zirconium dichloride,
rac-dimethylsilylene-bis(1-{2-s-butyl-4-(β-naphthyl)indenyl})zirconium dichloride,
rac-dimethylsilylene-bis(1-{2-s-butyl-4-(8-methyl-9-naphthyl)indenyl})zirconium dichloride,
rac-dimethylsilylene-bis(1-{2-s-butyl-4-(5-acenaphthyl)indenyl})zirconium dichloride,
rac-dimethylsilylene-bis(1-{2-s-butyl-4-(9-anthracenyl)indenyl})zirconium dichloride,
rac-dimethylsilylene-bis(1-{2-s-butyl-4-(9-phenanthryl)indenyl})zirconium dichloride,
rac-dimethylsilylene-bis{1-(2-n-pentyl-4-phenylindenyl)}zirconium dichloride,
rac-dimethylsilylene-bis(1-{2-n-pentyl-4-(α-naphthyl)indenyl})zirconium dichloride,
rac-dimethylsilylene-bis{1-(2-n-butyl-4-phenylindenyl)}zirconium dichloride,
rac-dimethylsilylene-bis(1-{2-n-butyl-4-(α-naphthyl)indenyl})zirconium dichloride,
rac-dimethylsilylene-bis(1-{2-n-butyl-4-(β-naphthyl)indenyl})zirconium dichloride,
rac-dimethylsilylene-bis(1-{2-n-butyl-4-(2-methyl-1-naphthyl)indenyl})zirconium dichloride,
rac-dimethylsilylene-bis(1-{2-n-butyl-4-(5-acenaphthyl)indenyl})zirconium dichloride,
rac-dimethylsilylene-bis(1-{2-n-butyl-4-(9-anthracenyl)indenyl})zirconium dichloride,
rac-dimethylsilylene-bis(1-{2-n-butyl-4-(9-phenanthryl)indenyl})zirconium dichloride,
rac-dimethylsilylene-bis{1-(2-i-butyl-4-phenylindenyl)}zirconium dichloride,
rac-dimethylsilylene-bis(1-{2-i-butyl-4-(α-naphthyl)indenyl})zirconium dichloride,
rac-dimethylsilylene-bis(1-{2-i-butyl-4-(β-naphthyl)indenyl})zirconium dichloride,
rac-dimethylsilylene-bis(1-{2-i-butyl-4-(2-methyl-1-naphthyl)indenyl})zirconium dichloride,
rac-dimethylsilylene-bis(1-{2-i-butyl-4-(5-acenaphthyl)indenyl})zirconium dichloride,
rac-dimethylsilylene-bis(1-{2-i-butyl-4-(9-anthracenyl)indenyl})zirconium dichloride,
rac-dimethylsilylene-bis(1-{2-i-butyl-4-(9-phenanthryl)in-denyl})zirconium dichloride,
rac-dimethylsilylene-bis{1-(2-neopentyl-4-phenylindenyl)}zirconium dichloride,
rac-dimethylsilylene-bis(1-{2-neopentyl-4-(α-naphthyl)indenyl})zirconium dichloride,
rac-dimethylsilylene-bis{1-(2-n-hexyl-4-phenylindenyl)}zirconium dichloride,
rac-dimethylsilylene-bis(1-{2-n-hexyl-4-(α-naphthyl)indenyl})zirconium dichloride,
rac-methylphenylsilylene-bis{1-(2-ethyl-4-phenylindenyl)}zirconium dichloride,
rac-methylphenylsilylene-bis(1-{2-ethyl-4-(α-naphthyl)indenyl})zirconium dichloride,
rac-methylphenylsilylene-bis(1-{2-ethyl-4-(9-anthracenyl)indenyl})zirconium dichloride,
rac-methylphenylsilylene-bis(1-{2-ethyl-4-(9-phenanthryl)indenyl})zirconium dichloride,
rac-diphenylsilylene-bis{1-(2-ethyl-4-phenylindenyl)}zirconium dichloride,
rac-diphenylsilylene-bis(1-{2-ethyl-4-(α-naphthyl)indenyl})zirconium dichloride, rac-diphenylsilylene-bis(1-{2-ethyl-4-(9-anthracenyl) indenyl})zirconium dichloride,
rac-diphenylsilylene-bis(1-{2-ethyl-4-(9-phenanthryl) indenyl})zirconium dichloride,
rac-diphenylsilylene-bis(1-{2-ethyl-4-(4-biphenylyl) indenyl})zirconium dichloride,
rac-methylene-bis{1-(2-ethyl-4-phenylindenyl)}-zirconium dichloride,
rac-methylene-bis(1-{2-ethyl-4-α-naphthyl)indenyl}) zirconium dichloride,
rac-ethylene-bis{1-(2-ethyl-4-phenylindenyl)}-zirconium dichloride,
rac-ethylene-bis(1-{2-ethyl-4-(α-naphthyl)indenyl}) zirconium dichloride,
rac-ethylene-bis(1-{2-n-propyl-4-(α-naphthyl)indenyl}) zirconium dichloride,
rac-dimethylgermylene-bis{1-(2-ethyl-4-phenylindenyl) }zirconium dichloride,
rac-dimethylgermylene-bis(-1-{2-ethyl-4-(α-naphthyl) indenyl})zirconium dichloride,
rac-dimethylgermylene-bis{1-(2-n-propyl-4-phenylindenyl)}zirconium dichloride,
rac-dimethylstannylene-bis{1-(2-ethyl-4-phenylindenyl) }zirconium dichloride,
rac-dimethylstannylene-bis(1-{2-ethyl-4-(α-naphthyl) indenyl})zirconium dichloride,
rac-dimethylstannylene-bis(1-{2-n-ethyl-4-(9-phenanthryl)indenyl})zirconium dichloride,
rac-dimethylstannylene-bis{1-(2-n-propyl-4-phenylindenyl)}zirconium dichloride and so on.

Further, there may be exemplified transition metal compounds (a) in which the zirconium atom in the above-cited transition metal compounds (a) is replaced with titanium atom, hafnium atom, vanadium atom, niobium atom, tantalum atom, chromium atom, molybdenum atom or wolfram atom.

In general, the transition metal compound (a) is incorporated as a component for the catalyst for polymerizing olefins in the form of racemic body, while an R-form or S-form compound (a) may also be utilized. According to the present invention, a plurality of the transition metal compounds (a) as given above can also be used in combination.

At least one compound selected from the group consisting of (b) organoaluminum compounds, (c) organoaluminum-oxy compounds and (d) ionizing ionic compounds is employed as activator capable of activating the above-mentioned transition metal compounds (a).

The organoaluminum compound (b) is represented, for example, by the following formula (3):

$$(R^1)_nAlX_{3-n} \tag{3}$$

in which $R^1$ is a hydrocarbon group having 1–12 carbon atoms, X denotes a halogen atom or hydrogen atom and n is an integer of 1–3.

In the formula (3), $R^1$ represents a hydrocarbyl group having 1–12 carbon atoms, such as alkyl, cycloalkyl or aryl and, concretely, it stands for methyl, ethyl, n-propyl, isopropyl, isobutyl, pentyl, hexyl, octyl, cyclopentyl, cyclohexyl, phenyl or tolyl.

Concrete examples of such an organoaluminum compound (b) include trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum and so on; dialkylaluminum halides, such as dimethylaluminum chloride, diethylaluminum chloride, diisopropylaluminum chloride, diisobutylaluminum chloride and dimethylalumunim bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

It is permissible to use, as the organoaluminum compound (b), also the compounds represented by the following formula (4):

$$(R^1)_nAlY_{3-n} \tag{4}$$

in which $R^1$ is the same as $R^1$ in the formula (3), Y denotes a group of $-OR^2$, $-OSi(R^3)_3$, $-OAl(R^4)_2$, $-N(R^5)_2$, $-Si(R^6)_3$ or $-N(R^7)Al(R^8)_2$ and n is a number of 1 or 2, wherein $R^2$, $R^3$, $R^4$ and $R^8$ denote each methyl, ethyl, isopropyl, isobutyl, cyclohexyl or phenyl, $R^5$ denotes hydrogen atom, methyl, ethyl, isopropyl, phenyl or trimethylsilyl and $R^6$ and $R^7$ represent each methyl, ethyl or the like.

Concretely, there may be enumerated the following compounds:

1) Compounds represented by $(R^1)_nAl(OR^2)_{3-n}$, for example, dimethylaluminum methoxide, diethylaluminum ethoxide and diisobutylaluminum methoxide
2) Compounds represented by $(R^1)_nAl\{OSi(R^3)_3\}_{3-n}$, for example, $Et_2Al(OSiMe_3)$, $(iso-Bu)_2Al(OSiMe_3)$ and $(iso-Bu)_2Al(OSiEt_3)$
3) Compounds represented by $(R^1)_nAl\{OAl(R^4)_2\}_{3-1}$, for example, $Et_2AlOAlEt_2$ and $(iso-Bu)_2AlOAl(iso-Bu)_2$
4) Compounds represented by $(R^1)_nAl\{N(R^5)_2\}_{3-n}$, for example, $Me_2AlNEt_2$, $Et_2AlNHMe$, $Me_2AlNHEt$, $Et_2AlN(SiMe_3)_2$ and $(iso-Bu)_2AlN(SiMe_3)_2$
5) Compounds represented by $(R^1)_nAl\{Si(R^6)_3\}_{3-n}$, for example, $(iso-Bu)_2AlSiMe_3$ and the like
6) Compounds represented by $(R^1)_nAl\{N(R^7)Al(R^8)_2\}_{3-n}$, for example, $Et_2AlN(Me)AlEt_2$ and $(iso-Bu)_2AlN(Et)Al(iso-Bu)_2$ In the above, Me represents methyl group, Et represents ethyl group and Bu represents butyl group.

Among them, compounds represented by the formulae $(R^1)_3Al$, $(R^1)_nAl(OR^2)_{3-n}$ and $(R^1)_nAl\{OAl(R^4)_2\}_{3-n}$ are preferred, wherein special preference is given to those compounds in which R denotes an iso-alkyl and n is 2. It is permissible to use them in combination.

The organoaluminum compounds (c) may be known aluminoxanes soluble in benzene or may be organoaluminum-oxy compounds insoluble in benzene disclosed in Japanese Patent Kokai Hei-2-276807 A (corresponding to U.S. Pat. No. 5,218,071 and EP 495099 A1).

These aluminoxanes can be prepared, for example, by the methods given below:

(1) A method in which an organoaluminum compound, such as trialkylaluminum, is added to a suspension of a salt containing adsorbed moisture or water of cristallization, such as hydrated salt of magnesium chloride, copper sulfate, aluminum sulfate, nickel sulfate or cerous chloride, in a hydrocarbon solvent, to cause a reaction.

(2) A method in which an organoaluminum compound, such as trialkylaluminum, is reacted dierectly with water, ice or steam in a medium, such as benzene, toluene, ethyl ether or tetrahydrofuran.

(3) A method in which an organoaluminum compound, such as trialkylaluminum, is reacted with an organotin oxide, such as dimethyltin oxide or dibutyltin oxide, in a medium, such as decane, benzene or toluene.

These aluminoxanes may contain a small amount of organometallic component(s). They may be re-dissolved in a solvent, after the reaction solvent or the unreacted organoaluminum compound has been removed from the recovered aluminoxane solution by distillation.

As the organoaluminum compound to be used on the preparation of the aluminoxane, concretely, those exemplified above for the organoaluminum compound (b) may be enumerated. Among them, special preference is given to trialkylaluminums and tricycloalkylaluminums. The organoaluminum compounds may also be employed in a combination.

As the solvent used in the preparation of the aluminoxane, there may be exemplified aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum cut fractions, such as gasoline, kerosene and gas oil; and halogenated hydrocarbons, especially those chlorinated or brominated products of the aromatic, aliphatic and alicyclic hydrocarbons given above. Other solvents, for example, ethers, such as ethyl ether and tertahydrofuran may also be used. Among these solvents, especially aromatic hydrocarbons are preferred.

The benzene-insoluble organoaluminum-oxy compounds (c) to be used according to the present invention have an Al component soluble in benzene at 60° C. of 10% or less, preferably 5% or less and especially preferably 2% or less, and are insoluble or difficultly soluble in benzene.

The solubility of the organoaluminum-oxy compound (c) is determined by suspending such an amount of the organoaluminum-oxy compound as corresponding to 100 mg of aluminum atom in 100 ml of benzene and, then, mixing at 60° C. with stirring for 6 hours, before effecting a hot filteration at 60° C. through a jacketted G-5 glass filter with four times washings of the solid residue retained on the glass filter with each 50 ml of benzene of 60° C. and, then, determining the amount of aluminum atom in the total filtrate (X mmol corresponding to X %).

The ionizing ionic compound (d) serves for reacting with the transition metal compound (a) represented by the formula (1) to form an ion pair. For the ionizing ionic compound (d), there may be exemplified Lewis acids, ionic compounds and carboranes as disclosed in, for example, Japanese Patent Kohyos Hei-1-501950 A (corresponding to U.S. Pat. No. 5,198,401 and EP 277003 A1), Hei-1-502036 A (corresponding to U.S. Pat. No. 5,153,157 and EP 277004 A1) and Japanese Patent Kokais Hei-3-179005 A (corresponding to U.S. Pat. No. 5,561,092 and EP 427697 A2), Hei-3-179006 A (corresponding to U.S. Pat. No. 5,225,500 and EP 427696 A2), Hei-3-207703 A (corresponding to U.S. Pat. No. 5,387,568 and EP 426637 A2), Hei-3-207704 A (corresponding to U.S. Pat. No. 5,519,100 and EP 426638 A2) and U.S. Pat. No. 5,321,106.

As the Lewis acid, there may be enumerated for example, triphenylboron, tris(4-fluorophenyl)boron, tris(p-tolyl) boron, tris(o-tolyl)boron, tris(3,5-dimethylphenyl)boron, tris(pentafluorophenyl)boron, $MgCl_2$, $Al_2O_3$ and $SiO_2$—$Al_2O_3$.

As the ionic compound, there may be enumerated for example, triphenylcarbenium tetrakis(pentafluorophenyl) borate, tri-n-butylammonium tetrakis(pentafluorophenyl) borate, N,N-dimethylammonium tetrakis (pentafluorophenyl)borate and ferrocenium tetra (pentafluorophenyl)borate.

As the carboranes, there may be enumerated, for example, dodecaborane, 1-carbaundecaborane, bis-n-butyl-ammonium(1-carbedodeca)borate, tri-n-butylammonium-(7,8-dicarbaundeca)borate, and tri-n-butylammonium-(tridecahydrido-7-carbaundeca)borate.

These ionizing ionic compounds (d) may be used either alone or in a combination of two or more of them. It is possible to use, as the activator for activating the transition metal compound (a), the above-mentioned components (b), (c) and (d) in a combination.

The metallocene catalyst can be prepared by mixing at least one activator compound selected from the group consisting of the above-mentioned compounds (b) to (d), together with the transition metal compound (a) in an inert hydrocarbon solvent or olefin solvent.

As the inert hydrocarbon solvent to be used in the preparation of the catalyst based on metallocene, there may be exemplified aliphatic hydrocarbons, such as propane, butane, pentane, hexane, heptane, octane, decane, dodecane and hexadecane; alicyclic hydrocarbons, such as cyclopentane, cyclohexane, methylcyclopentane, and cyclooctane; aromatic hydrocarbons, such as benzene, toluene and xylene; halogenated hydrocarbons, such as ethylene chloride, chlorobenzene and dichloromethane; petroleum cut fractions, such as gasoline, kerosene and gas oil; and mixtures of them.

Upon the preparation of the metallocene catalyst from these components, the transition metal compound (a) may favorably be used usually at a concentration of about $10^{-8}$–$10^{-1}$ mole/liter (of polymerization volume), preferably $10^{-7}$–$5 \times 10^{-2}$ mole/liter.

When the component (b) and/or (c) is used as the activator component, the component (b) and/or (c) may favorably be used usually in an amount of 10– 10,000, preferably 20–5, 000 as the atomic ratio of aluminum to the transition metal of the tansition metal compound (a) {i.e. Al/transition metal}. When the organoaluminum compound (b) and the organoaluminum-oxy compound (c) are used concurrently, it is favorable to use them in such an amount that the atomic ratio (Al-1/Al-2) of aluminum atom (Al-1) in the component (b) to the aluminum atom (Al-2) in the component (c) will be in the range of 0.02–3, preferably 0.05–1.5.

When the ionizing ionic compound (d) is used, it may be used usually in such an amount that the mole ratio of the transition metal (a) to the component (d), namely, (a)/(d), will be in the range of 0.01–10, preferably 0.1–5.

These catalyst components may either be mixed in the polymerization reactor or be added to the polymerization reactor as a preliminarily mixed blend. When these components are blended preliminarily, they may be contacted together usually at a temperature of −50 to +150° C., preferably −20 to +120° C., for 1 minute to 50 hours, preferably 5 minutes to 25 hours. Upon the mixing contact, the mixing temperature may be varied.

The metallocene catalyst may be a solid catalyst having either one or all of the above-mentioned components (a) to (d) supported on a granular or fine particulate solid material (carrier).

The carrier may be of organic or inorganic material. For the inorganic carrier, porous oxides are used preferably, for example, $SiO_2$ and $Al_2O_3$. For the organic carrier, for example, homo- and co-polymerized products formed mainly of an α-olefin having 2–14 carbon atoms, such as ethylene, propylene, 1-butene or 4-methyl-1-pentene, and homo- and co-polymerized products formed mainly of vinylcyclohexane and styrene may be used.

The metallocene catalyst may also be used after a prepolymerized catalyst has been formed by causing each of the catalyst components to be prepolymerized with an olefin. For the olefin to be subjected to such prepolymerization, there may be employed α-olefins, for example, propylene, ethylene and 1-butene, wherein they may be used in combination with other olefins.

On preparing the metallocene-based catalyst, component (s), which are useful for polymerization of olefin, other than the catalyst components mentioned above, can be incorporated, for example, water as a catalyst component.

The propylene/ethylene/1-butene random copolymer (C) can be produced by co-polymerizing propylene with 1-butene and ethylene in the presence of the catalyst based on metallocene mentioned above.

The polymerization can be realized either in a liquid phase polymerization, such as suspension polymerization and solution polymerization, or in a gas phase polymerization. In a liquid phase polymerization, the same inert hydrocarbon solvent as used in the preparation of the catalyst can be used and, further, α-olefins, such as propylene and so on, may also be employed for the solvent.

When the polymerization is carried out in a suspension polymerization, it is favorable to effect the polymerization at a temperature of −50 to +100° C., preferably 0 to 90° C., whereas when the polymerization is carried out in a solution polymerization, it is favorable to choose a polymerization temperature of 0–250° C., preferably 20–200° C. When a gas phase polymerization is employed, the polymerization may favorably be carried out at a temperature of 0–120° C., preferably 20–100° C., under a pressure of from normal pressure to 9.8 MPa (100 kgf/cm$^2$, gauge), prefrably from normal pressure to 4.9 MPa (50 kgf/cm$^2$, gauge).

The polymerization can be effected either in a batch-wise process, in a semi-continuous process or in a continuous process. It is possible to effect the polymerization in two or more steps to be performed each under a different reaction condition. The molecular weight of the resulting copolymer can be adjusted by, for example, effecting the polymerization in the presence of hydrogen or by alteraing the polymerization temperature or the polymerization pressure.

The polyolefin resin composition to be used according to the present invention comprises the polypropylene resin (A) in an amount of preferably 50–95 parts by weight, more preferably 60–92 parts by weight, the ethylene/α-olefin random copolymer (B) in an amount of preferably 3–40 parts by weight, more preferably 5–30 parts by weight, and the propylene/ethylene/1-butene random copolymer (C) in an amount of preferably 2–30 parts by weight, more preferably 3–25 parts by weight, wherein the total amount of these components (A), (B) and (C) sums up to 100 parts by weight.

The polyolefin resin composition to be used according to the present invention may contain, in addition to the polypropylene (A), the ethylene/α-olefin random copolymer (B) and the propylene/ethylene/1-butene random copolymer (C), other ingredient(s), such as additives and other polymer (s), within the limit not obstructing the purpse of the present invention.

As the additives, there may be enumerated anti-weathering stabilizer, heat stabilizer, anti-fogging agent, anti-blocking agent, slipping agent, lubricant, antistatic agent, fire retardant, pigments, dyestuffs and filler.

The technique for preparing the polyolefin resin composition to be used according to the present invention is not specifically restricted and it can be produced by a usual method known for preparing polyolefin resin composition, for example, by melt-kneading the polyolefin (A), the ethylene/α-olefin random copolymer (B) and the propylene/ethylene/1-butene random copolymer (C) as well as other ingredient(s) to be incorporated optionally.

Concretely, the polyolefin resin composition to be used according to the present invention can be prepared by charging an adequate mixing device, such as Henschel mixer, V-shaped blender, tumbler mixer or ribbon blender, with the above-mentioned components and ingredients all at once or successively and mixing them therein, followed by melt-kneading the resulting mixture on, for example, a monoaxial or multiaxial extruder, kneader or Bumbury's mixer.

The polyolefin resin composition to be used according to the present invention may favorably have an MFR (ASTM D 1238, 230° C., 2.16 kg load) of 1 to 100 g/10 min., in particular, 1 to 50 g/10 min.

The melting point (DSC method) of the polyolefin resin composition to be used according to the present invention may favorably be 100–167° C., in particular, 120–167° C.

The hollow vessel for sterilization according to the present invention is made of the above-described polyolefin resin or a composition of such resin. There is no restiction as to the form of the vessel and may be present in a voluntary form, such as bottle, tank, cup or so on.

The hollow vessel for sterilization according to the present invention can be molded by known molding techniques, such as extrusion blow molding, injection blow molding, pneumatic molding, vacuum molding and injection molding. Among them, extrusion blow molding is preferred. In performing such a molding process, an apparatus and molding conditions selected adequately among those conventionally employed for molding known polyolefin resins and polyolefin resin compositions can be employed.

For example, in case of extrusion blow molding, the polyolefin resin or the resin composition described above is extruded from the extrusion die in a molten state at a temperature in the range from 150 to 300° C. into a tubular parison. This parison is placed in a metal mold with a mold cavity having an inner contour coresponding to the shape of the hollow vessel and air is blown into this parison at a resin temperature in the range from 150 to 300° C. to form the hollow vessel. The stretching magnification may preferably be 1.5–5 times in lateral direction.

The hollow vessel according to the present invention is superior in the transparency and in the impact strength, develops scarce odor and maintains these characteristic properties, especially the superior transparency at a high level, even after it has been subjected to a steam sterilization treatment, whereby it may favorably be used as a vessel for enclosing therein liquids, liquid food products and medical goods and utensils for subjecting to a heat sterilization treatment. Concrete examples of such vessels include bottles for mineral waters, fruit juices and refreshing drinks, medical transfusion bottle, eye drop container and so on. The hollow vessel according to the present invention permits to subject such food products, medical goods and utensils received therein to heat sterilization by, for example, a steam of a temperature of 121° C., in the state contained therein as such. The hollow vessel which has been subjected to the heat sterilization together with the contents therein can be stored or brought into transport route. as such. Here, there is no fear of leaking out of the vessel contents due to rupture accident, since the vessel is superior in the impact resistance. Moreover, the vessel contents can be visually recognized, since the vessel is superior in the transparency, even after the vessel has been subjected to a steam sterilization.

As described above, the hollow vessel for heat sterilization according to the present invention is superior in the transparency and impact resistance, emits scarce odor, and preserves these advantageous features, especially the superior transparency, even after it has been subjected to a steam sterilization treatment, since it is made of a specific polyolefin resin or of a specific resin composition comprising the polypropylene resin (A) having special characteristic properties, the specific ethylene/α-olefin random copolymer (B) and the specific propylene/ethylene/1-butene random copolymer (C).

THE BEST MODE FOR EMBODYING THE INVENTION

Below, the present invention will further be described by way of Examples and Comparative Example, wherein the present invention is not restricted by these Examples.

The scheme for the assessments in Examples are as given below. The steam sterilization was carried out at 121° C. under a steam pressure of 0.22 MPa for 20 minutes.

Scheme for the Assessments (1) Transparency:

The haze as a parameter of the transparency was determined for a specimen taken from central portion of the side wall of the shell of the molded hollow vessel body (wall thickness of 0.5 mm) in accordance with ASTM D 1330 ($Haze_1$). On the other hand, the same procedures were followed for determining the haze value is determined for a similar specimen taken from the steam sterilized hollow vessel ($Haze_2$) to obtain Δ Haze value.

Further, a resin specimen having a width of 0.9 cm and a length of 4 cm was taken from central portion of the side wall of the shell of the vessel body and this specimen was immersed in the water layer in a UV absorption determination cell of a UV spectrophotometer filled with water and the light transmission through this cell was determined at a wave length of 450 nm. The light transmission was also determined for the cell filled only with water and without resin specimen, for use as the reference transmission. For a similar specimen of a steam sterilized hollow vessel, the same procedure was performed for determining its light transmission in water. From these transmission valued, underwater light transmittance was calculated by the following caluculation equation:

$$\text{Underwater light transmittance \%} = \frac{(\text{Light transmission with specimen})}{(\text{Reference transmission})} \times 100$$

(2) Elastic Modulus:

A resin specimen having a thickness of 0.5 mm was taken from central portion of the side wall of the shell of the vessel body and the tensile elastic modulus thereof was determined in accordance with ASTM D 638. Also for a similar specimen of the vessel which has been subjected to a steam sterilization, the same procedures were repeated for its tensile elastic modulus.

(3) Impact Resistance:

A resin specimen having a thickness of 0.5 mm, a length of 9 cm and a width of 9 cm was taken from central portion of the side wall of the vessel body and was maintained at 0° C. for 2 hours, before the impact resistance expressed by the total rupture energy was determined on a high-speed impact tester of the firm Rheometrics. Thus, the test specimen was settled by fastening it on a jig having a hole of 1 inch diameter and a rush probe having a semispherical rush top of 0.5 inch diameter was caused to impinge onto the specimen at an impingement speed of 3 m/sec to break the specimen, in order to determine the total rupture energy required for rupturing the specimen at a temperature of 0° C. by observing the displacement of the rush probe upon the impingement and the impact strength corresponding thereto using a load cell attached to the rush probe. The total rupture energy is determined by preparing a shock wave diagram of the rush probe displacement (m) upon the impingement taken on the X-coordinate versus the impact strength (N) taken on the Y-coordinate and measuring the area surrounded by the shock wave and the X-axis. For the specimen which had been subjected to a steam sterilization also, the total rupture energy was determined in the same manner.

Ten bottles having an inner capacity of 270 ml and a wall thickness of 0.5 mm were filled with water and closed each with a plug. After having been stored in a constant temperature chamber at a temperature of 0° C. for 24 hours, each of them was caused to fall onto the floor from a height of 1.8 m repeatedly until the bottle was damaged. The number of repeats of the falling bottle test experienced up to occurence of a damage of the bottle was averaged for the ten bottles. The similar average number of repeats of the falling bottle test was observed also for the bottles which had been subjected to a steam sterilization treatment.

(4) Odor Test:

Ten bottles which had been obtained by molding at the same time were examined by a panel test by ten panelers. When all ten panelers had judged the tested specimen as exihibiting no or scarce unpleasant smell, such specimen was assessed with a symbol of ○. When even one paneler judged the tested specimen as exhibiting an unpleasant smell, the specimen was assesed with a symbol of x. The same odor test was performed also for the bottles having been subjected to a steam sterilization treatment.

PRODUCTION EXAMPLE 1

Production of Propylene/Ethylene/1-butene Random Copolymer (C) of low Molecular Weight Distribution using Metallocene Catalyst A propylene/ethylene/1-butene random copolymer to be used as the component (C) was produced using a metallocene catalyst. Thus, a two liter autoclave replaced sufficiently by nitrogen gas was charged with 95 ml of hexane and 70 g of 1-butene, whereto was added 1 mmol of triisobutylaluminum. The autoclave was heated at 70° C. and was supplied with propylene and ethylene until a total pressure of 0.69 MPa (7 kgf/cm², gauge) was reached, whereto was added 0.30 mmol of methylaluminoxane and 0.001 mmol, calculated as Zr atom, of rac-dimethylsilylene-bis(1-{2-n-propyl-4-(9-phenanthryl)indenyl})zirconium dichloride, whereupon propylene and ethylene were replenished succesively so as to settle the mole ratio of the supplied amount of propylene to the supplied amount of ethylene (propylene/ethylene) at 97/3 while maintaining the total pressure of 0.69 MPa (7 kgf/cm², gauge) in order to proceed polymerization for 30 minutes.

After the polymerization, the internal gas was evacuated and the resulting polymer was recovered in a plentiful amount of methanol, whereupon the polymer was dried under a reduced pressure at 110° C. for 12 hours. The resulting polymer (a propylene/ethylene/1-butene random copolymer; in the following denoted sometimes as m-PEBR) amounted to 28.0 g and the polymerization activity was found to be 56 kg of polymer per mmol of Zr per hour.

The composition, the material properties and so on of this m-PEBR (C) were as follows:

(1) Composition: Content of propylene unit=69.3 mole % Content of ethylene unit=10.2 mole % Content of 1-butene unit=20.5 mole %

(2) MFR (ASTM D-1238, 230° C., 2.16 kg load)=1.3 g/10 min.

(3) Molecular weight distribution (Mw/Mn) by GPC=2.2

(4) Three-membered chain structure constituted of head-to-tail-coupled propylene unit: present (5) Three-membered chain structure constituted of head-to-tail-coupled propylene unit and 1-butene unit containing propylene unit in the second site: present The molecular weight distribution (Mw/Mn) was determined using the apparatus of Model GPC-150C of the firm Water in the following manner. Thus, TSK GNH TH (with a diameter of 7.8 mm and a length of 600 mm) was employed for the separation column and the determination was performed at a column temperature of 140° C. using a mobile phase of o-dichlorobenzene (of Wako Pure Chemical Ind., Ltd.) with addition of 0.025% by weight of BHT (of Takeda Chemical Ind., Ltd.) as antioxidant, at a mobile velocity of 1.0 ml/min. and at a sample concentration of 0.1% by weight with a sample injection amount of 500 µl using a differential refractometer as the detector. For the standard monodisperse polystyrenes, those of the firm Toso were employed.

Comparative Production Example 1

Production of Propylene/Ethylene/1-butene of a large Molecular Weight Distribution using a Titanium Catalyst -1) Preparation of the Titanium Catalyst 4.75 g (50 mmol) of anhydrous magnesium chloride, 25 ml of decane and 23.4 ml (150 mmol) of 2-ethylhexyl alcohol were heated at 130° C. for 2 hours to cause reaction to thereby obtain a homogeneous solution, whereupon 1.11 g (7.5 mmol) of phthalic anhydride were added thereto and the mixture was agitated at 130° C. for further 1 hour so as to cause the added phthalic anhydride to be dissolved in the solution homogeneously. The resulting homogeneous solution was cooled down to room temperature, whereupon the entire solution was introduced into 200 ml (1.8 moles) of titanium tetrachloride maintained at −20° C. by dropping it thereinto over a period of 1 hours. After the introduction was over, the temperature of the resulting mixture was elevated up to 110° C. over a period of 4 hours. On reaching at 110° C., 2.68 ml (12.5 mmol) of diisobutyl phthalate were added thereto and the temperature of 110° C. was maintained for 2 hours with agitation. Then, the solid matter was collected by hot filtration and the so-collected solids were re-suspended in 200 ml of $TiCl_4$, whereupon the reaction was effected again by heating the suspension at 110° C. for 2 hours. After the reaction, the solid matter was collected again by hot filtration and was washed with decane and hexane at 110° C. sufficiently until no titanium compound was detected in the washed liquid.

The titanium catalyst obtained in this manner had a composition of 3.1% by weight of titanium, 56.0% by weight of chlorine, 17.0% by weight of magnesium and 20.9% by weight of diisobutyl phthalate.

-2) Polymerization

To a continuous polymerization reactor having an internal volume of 200 liters, there were supplied 100 liter/hr of hexane, 0.33 kg/hr of ethylene, 16 kg/hr of propylene and 14 kg/hr of 1-butene, while supplying thereto simultaneously hydrogen at such a feed rate that the hydrogen concentration in the gas phase will be maintained at 5 mole % and while supplying thereto also the titanium catalyst obtained as above at a feed rate of 25 mmol/hr calculated as titaniun atom, triisobutylaluminum at a feed rate of 50 mmol/hr and diphenyldimethoxysilane at a feed rate of 7.5 mmol/hr, in order to effect the copolymerization under a polymerization condition of a temperature of 70° C., a pressure of 0.39 MPa (4 kgf/cm², gauge) and a retention time of 1 hour, whereby a propylene/ethylene/1-butene random copolymer (in the following, referred to sometimes as Ti-PEBR) was obtained.

The composition, material properties and so on of this Ti-PEBR were as given below.

1) Composition:

Content of propylene unit=60 mole % Content of ethylene unit=10 mole % Content of 1-butene unit=30 mole %

2) MFR (ASTM D 1238, 230° C., 2.16 kg load)=4.0 g/10 min

3) Molecular weight distribution (Mw/Mn) by GPC=4.1

4) Three-membered chain structure constituted of head-to-tail-coupled propylene unit: present 5) Three-membered chain structure constituted of head-to-tail-coupled propylene unit and 1-butene unit containing propylene unit in the second site: present Example 1

70 parts by weight of a propylene/ethylene/1-butene random copolymer (A) (abbreviated hereinafter as R-PP1) having a propylene unit content of 94.9 mole %, an ethylene unit content of 3.3 mole % and a 1-butene unit content of 1.8 mole % and having an MFR (ASTM D 1238, 230° C., 2.16 kg load) of 6.7 g/10 min. as the component (A), 20 parts by weight of an ethylene/1-butene random copolymer (B) (referred to in the following sometimes as EBR) obtained using a catalyst based on vanadium and having an ethylene unit content of 89 mole %, a 1-butene unit content of 11 mole %, a density of 0.885 g/cm³ and an MFR (ASTM D 1238, 190° C., 2.16 kg load) of 3.6 g/10 min. as the component (B) and 10 parts by weight of the m-PEBR obtained in Production Example 1 as the component (C) were mixed on a mixer. The resulting mixture was melt-kneaded on an extruder at a temperature of 210° C. and extruded therefrom into a strand of polyolefin resin composition, which was cut in an aqueous medium to produce pelletized product of polyolefin resin composition.

A resin bottle having an internal volume of 270 ml was formed from the above pelletized resin using a blow molding machine (a hollow molding machine 3B50 of the firm Placo) under the conditions as given below:

○ Cylinder temperature=180° C.
○ Screw revolution rate=20 rpm
○ Die/core: φ19/φ16.5 tapered die
○ Mold: Flat 270 cc bottle (water-cooled at 20° C.)
○ weight of the molded article=11±0.5 g
○ Air blowing pressure: 0.49 MPa (5 kgf/cm², gauge)
○ Air blowing time: 14 seconds The quality of the molded bottle was assessed by the assessment scheme given previously. The results are given in Table 1.

Example 2

A resin bottle was formed in the same manner as in Example 1, except that the blending proportions for the ethylene/1-butene random copolymer (B) and for the m-PEBR (C) were changed to 10 parts by weight and 20 parts by weight, respectively. The results of assessment are given in Table 1.

Example 3

A resin bottle was formed in the same manner as in Example 1, except that a propylene/ethylene/1-butene random copolymer (A), abbreviated hereinafter as R-PP2, having a propylene unit content of 93.7 mole %, an ethylene unit content of 3.4 mole %, a 1-buten unit content of 2.9 mole % and an MFR (ASTM D 1238, 230° C., 2.16 kg load) of 6.7 g/10 min. was used in the place of R-PP1 (A). The results of assessment are given in Table 1.

Example 4

A resin bottle was formed in the same manner as in Example 1, except that R-PP2 (A) was used in the place of the R-PP1 (A) and the blending proportions for the ethylene/1-butene random copolymer (B) and for the m-PEBR (C) were changed to 10 parts by weight and 20 parts by weight, respectively. The results of assessment are given in Table 1.

Comparative Example 1

A resin bottle was formed in the same manner as in Example 1, except that the ethylene/1-butene random copolymer (B) and the m-PEBR (C) were not incorporated and only the R-PP1 (A) was employed. The results of assessment are given in Table 2.

Comparative Example 2

A resin bottle was formed in the same manner as in Example 1, except that the m-PEBR (C) was not incorporated and the blending proportions for the R-PP1 (A) was changed to 80 parts by weight. The results of assessment are given in Table 2.

Comparative Example 3

A resin bottle was formed in the same manner as in Comparative Example 1, except that 0.2% by weight of benzylidene sorbitol was added as a nucleating agent to the R-PP1 (A). The results of assessment are given in Table 2.

Comparative Examples 4 and 5

A resin bottle was formed in the same manner as in Example 1, except that the resin composition as given in Table 2 was employed. The results of assessment are given in Table 2.

TABLE 1

|  | Example | | | |
| --- | --- | --- | --- | --- |
|  | 1 | 2 | 3 | 4 |
| Blended amount of components | | | | |
| R-PP1 (A) *1) | 70 | 70 | — | — |
| R-PP2 (A) *2) | — | — | 70 | 70 |
| EBR (B) *3) | 20 | 10 | 20 | 10 |
| m-PEBR (C) *4) | 10 | 20 | 10 | 20 |
| Ti-PEBR *5) | — | — | — | — |
| Nucleating agent *6) | — | — | — | — |
| Properties of hollow vessel *7) | | | | |
| Before the steam sterilization: | | | | |
| Haze (%) | 16 | 17 | 16 | 16 |
| Underwat. light transmit. (%) | 94 | 92 | 94 | 95 |
| Tensile elastic modulus (MPa) | 450 | 450 | 400 | 300 |
| Impact resistance (J) | 3.5 | 4.0 | 4.3 | 4.6 |
| Falling bottle test (repeats) | ≧10 repeats | ≧10 repeats | ≧10 repeats | ≧10 repeats |
| Odor | ○ | ○ | ○ | ○ |
| After the steam sterilization: | | | | |
| Haze (%) | 25 | 23 | 24 | 22 |
| Δ Haze (%) | 9 | 6 | 8 | 6 |
| Underwat. light transmit. (%) | 89 | 90 | 87 | 88 |
| Tensile elastic modulus (MPa) | 550 | 550 | 500 | 450 |
| Impact resistance (J) | 2.6 | 2.9 | 3.1 | 3.3 |
| Falling bottle test (repeats) | ≧10 repeats | ≧10 repeats | ≧10 repeats | ≧10 repeats |
| Odor | ○ | ○ | ○ | ○ |

TABLE 2

|  | Comparative Example | | | | |
| --- | --- | --- | --- | --- | --- |
|  | 1 | 2 | 3 | 4 | 5 |
| Blended amount of components | | | | | |
| R-PP1 (A) *1) | 100 | 80 | 100 | 90 | 70 |
| R-PP2 (A) *2) | — | — | — | — | — |
| EBR (B) *3) | — | 20 | — | — | 10 |
| m-PEBR (C) *4) | — | — | — | 10 | — |
| Ti-PEBR *5) | — | — | — | — | 20 |
| Nucleating agent *6) | — | — | 0.2 | — | — |

TABLE 2-continued

| | Comparative Example | | | | |
|---|---|---|---|---|---|
| | 1 | 2 | 3 | 4 | 5 |
| Properties of hollow vessel *7) | | | | | |
| Before the steam sterilization: | | | | | |
| Haze (%) | 46 | 30 | 15 | 25 | 15 |
| Underwat. light transmit. (%) | 70 | 85 | 95 | 90 | 90 |
| Tensile elastic modulus (MPa) | 800 | 620 | 900 | 650 | 350 |
| Impact resistance (J) | 0.6 | 1.0 | 0.5 | 1.2 | 3.0 |
| Falling bottle test (repeats) | zero | 3 | zero | zero | ≧10 |
| Odor | ○ | ○ | × | ○ | ○ |
| After the steam sterilization: | | | | | |
| Haze (%) | 47 | 32 | 18 | 28 | 40 |
| Δ Haze (%) | 1 | 2 | 3 | 3 | 25 |
| Underwat. light transmit. (%) | 55 | 65 | 92 | 85 | 65 |
| Tensile elastic modulus (MPa) | 900 | 720 | 950 | 730 | 450 |
| Impact resistance (J) | 0.4 | 0.8 | 0.3 | 0.8 | 2.6 |
| Falling bottle test (repeats) | zero | zero | zero | zero | ≧10 |
| Odor | ○ | ○ | × | ○ | ○ |

Notes for Tables 1 and 2:
*1): R-PP1 (A) having a propylene unit content of 94.9 mole %, an ethylene unit content of 3.3 mole % and a 1-butene unit content of 1.8 mole %.
*2): R-PP2 (A) having a propylene unit content of 93.7 mole %, an ethylene unit content of 3.4 mole % and 1 1-butene unit content of 2.9 mole %
*3): EBR (B) having an ethylene unit content of 89 mole %, a 1-butene unit content of 11 mole %, a density of 0.885 g/cm³ and an MFR of 3.6 g/10 min.
*4): m-PEBR (C) having a propylene unit content of 69.3 mole %, an ethylene unit content of 10.2 mole %, a 1-butene unit content of 20.5 mole %, an MFR of 1.3 g/10 min. and an Mw/Mn of 2.2, produced by using a metallocene catalyst.
*5) Ti-PEBR having a propylene unit content of 60 mole %, an ethylene unit content of 10 mole %, a 1-butene unit content of 30 mole %, an MFR of 4.0 g/10 min. and an Mw/Mn of 4.1, produced using a titanium-based catalyst.
*6) Benzylidene sorbitol as the nucleating agent.
*7) As defined previously.

What is claimed is:

1. A hollow vessel for heat sterilization, made of a polyolefin resin having characteristic properties comprising 1) an underwater light transmittance of 70–99% resulting from determination of light transmission at a wave length of 450 nm for a resin specimen of a thickness of 0.5 mm which has been subjected to a heat sterilization treatment with steam at a temperature of 121° C. for 20 minutes, 2) a tensile elastic modulus of 200–700 MPa, determined according to ASTM D 638 for a resin specimen of a thickness of 0.5 mm which has been subjected to a heat sterilization treatment with steam at a temperature of 121° C. for 20 minutes, 3) a haze difference Δ Haze between the Haze₂ value and the Haze1 value (Haze₂–Haze₁) of 1–20%, determined according to ASTM D 1330 for a resin specimen of a thickness of 0.5 mm respectively after and before the specimen has been subjected to a heat sterilization treatment with steam at a temperature of 121° C. for 20 minutes, and 4) a high-speed impact strength of 1.5–10 J, determined on an impact test at 0° C. as the total rupture energy required for rupturing a resin specimen having a thickness of 0.5 mm, a length of 9 cm and a width of 9 cm which has been subjected to a heat sterilization treatment with steam at 121° C. for 20 minutes and is then held at 0° C. for 2 hours, wherein the impact test is carried out by settling the specimen by fastening it on a jig having a hole of 1 inch diameter and causing a rush probe having a semispherical rush top of 0.5 inch diameter to impinge onto the specimen at an impingement speed of 3 m/sec.

2. A hollow vessel for heat sterilization as claimed in claim 1, wherein the polyolefin resin comprises (A) a polypropylene resin, (B) an ethylene/α-olefin random copolymer with the α-olefin having at least three carbon atoms, the said random copolymer having a content of the structural unit of ethylene of 60–95 mole %, a density of 0.86–0.94 g/cm³ and a melt flow rate, determined according to ASTM D 1238 at 190° C. under a load of 2.16 kg, of 0.01–50 g/10 min. and (C) a propylene/ethylene/1-butene random copolymer which meets the three conditions 5) to 7) given below, namely, condition 5) that it comprises 50–90 mole % of propylene unit, 2–30 mole % of ethylene unit and 8–40 mole % of 1-butene unit and that the content of 1-butene unit is greater than the content of ethylene unit;

condition 6) that it has a melt flow rate, determined according to ASTM D 1238 at 230° C. under a load of 2.16 kg, of 0.01–50 g/10 min.; and condition 7) that it has a molecular weight distribution expressed by Mw/Mn, determined by gel permeation chromatography (GPC), of 3 or less.

3. A hollow vessel for heat sterilization as claimed in claim 1, wherein the vessel is one in which a food product is enclosed and is subjected to a steam sterilization.

4. A hollow vessel for heat sterilization as claimed in claim 1, wherein the vessel is one in which medical goods are enclosed and are subjected to a steam sterilization.

5. A hollow vessel for heat sterilization as claimed in claim 1, wherein the average number of repeats of an impact test of sample vessels withstood to the test without causing rupture is at least 5, wherein the impact test is carried out by subjecting ten hollow vessels, each having an internal volume of 270 ml and a wall thickness of 0.5 mm obtained by blow molding, to a heat sterilization treatment with steam at 121° C. for 20 minutes, maintaining them at 0° C. for 24 hours after they are filled with water and then causing them repeatedly to fall on a floor from a height of 1.8 m.

6. A hollow vessel for heat sterilization as claimed in claim 5 wherein the polyolefin resin comprises (A) a polypropylene resin, (B) an ethylene/α-olefin random copolymer with the α-olefin having at least three carbon atoms, the said random copolymer having a content of the structural unit of ethylene of 60–95 mole %, a density of 0.86–0.94 g/cm³ and a melt flow rate, determined according to ASTM D 1238 at 190° C. under a load of 2.16 kg, of 0.01–50 g/10 min. and (C) a propylene/ethylene/1-butene random copolymer which meets the three conditions 5) to 7) given below, namely condition 5) that it comprises 50–90 mole % of propylene unit, 2–30 mole % of ethylene unit and 8–40 mole % of 1-butene unit and that the content of 1-butene unit is greater than the content of ethylene unit;

condition 6) that it has a melt flow rate, determined according to ASTM D 1238 at 230° C. under a load of 2.16 kg, of 0.01–50 g/10 min.; and condition 7) that it has a molecular weight distribution expressed by Mw/Mn, determined by gel permeation chromatography (GPC), of 3 or less.

7. A hollow vessel for heat sterilization as claimed in claim 6, wherein the polyolefin resin comprises 50–95 parts by weight of the polypropylene resin (A), 3–40 parts by weight of the ethylene/α-olefin random copolymer (B) and 2–30 parts by weight of the propylene/ethylene/1-butene random copolymer, with the amounts of (A), (B) and (C) summing up to 100 parts by weight.

8. A hollow vessel for heat sterilization as claimed in claim 6, wherein the polypropylene resin (A) comprises at least one selected from the group consisting of propylene homopolymers, propylene/α-olefin random copolymers having a content of the α-olefin other than propylene of 10 mole % or less and propylene/α-olefin block-copolymers having a content of n-decane-extractable portion of 10% by weight or less.

9. A hollow vessel for heat sterilization as claimed in claim 6, wherein the ethylene/α-olefin random copolymer (B) is obtained by a random copolymerization of ethylene and an α-olefin in the presence of a catalyst based on vanadium or based on metallocene.

10. A hollow vessel for heat sterilization as claimed in claim 6, wherein the propylene/ethylene/1-butene random copolymer (C) is obtained by a random copolymerization of propylene, ethylene and 1-butene in the presence of a catalyst based on metallocene.

11. A hollow vessel for heat sterilization as claimed in claim 10, wherein the catalyst based on metallocene comprises (I): a transition metal compound (a) of bridged type represented by the formula (1)

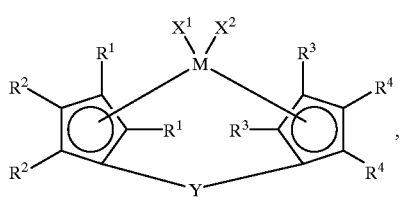

(1)

in which M denotes a transition metal atom of Groups IV–VIB of the periodic table; $R^1$, $R^2$, $R^3$ and $R^4$ represent each, identical with or different from each other, a hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group or may form a ring by combining a part of each of the groups adjoining each other together with the carbon atoms bound thereto; $X^1$ and $X^2$ stand each, identical with or different from each other, for hydrogen atom, a halogen atom, a hydrocarbyl of 1–20 carbon atoms, a halogenated hydrocarbyl of 1–20 carbon atoms or an oxygen- or sulfur-containing group; Y represents a divalent hydrocarbyl of 1–20 carbon atoms, a divalent halogenated hydrocarbyl of 1–20 carbon atoms, a divalent silisium- or germanium-containing group or stands for —O—, —CO—, —S—, —SO—, —$SO_2$—, —$NR^5$—, —$P(R^5)$—, —P(=O)($R^5$)—, —$BR^5$— or —$AlR^5$— with $R^5$ being hydrogen atom, a halogen atom, a hydrocarbyl of 1–20 carbon atoms or a halogenated hydrocarbyl of 1–20 carbon atoms, and (II) at least one compound capable of activating the above-identified transition metal compound (a) of bridged type and selected from the group consisting of (b) an organoaluminum compound, (c) an organoaluminum-oxy compound and (d) an ionizing ionic compound capable of forming an ion pair by reacting with the transition metal compound of bridge type represented by the above formula (1).

12. A hollow vessel for heat sterilization made of a polyolefin resin composition comprising (A) a polypropylene resin, (B) an ethylene/α-olefin random copolymer with the α-olefin having at least three carbon atoms, the said random copolymer having a content of the structural unit of ethylene of 60–95 mole %, a density of 0.86–0.94 g/cm³ and a melt flow rate, determined according to ASTM D 1238 at 190° C. under a load of 2.16 kg, of 0.01–50 g/10 min. and (C) a propylene/ethylene/1-butene random copolymer which meets the three conditions 5) to 7) given below, namely, condition 5) that it comprises 50–90 mole % of propylene unit, 2–30 mole % of ethylene unit and 8–40 mole % of 1-butene unit and that the content of 1-butene unit is greater than the content of ethylene unit;

condition 6) that it has a melt flow rate, determined according to ASTM D 1238 at 230° C. under a load of 2.16 kg, of 0.01–50 g/10 min.; and condition 7) that it has a molecular weight distribution expressed by Mw/Mn, determined by gel permeation chromatography (GPC), of 3 or less.

13. A hollow vessel for heat sterilization as claimed in claim 12, wherein the polypropylene resin (A) comprises at least one selected from the group consisting of propylene homopolymers, propylene/α-olefin random copolymers having a content of the α-olefin other than propylene of 10 mole % or less and propylene/α-olefin block copolymers having a content of n-decane-extractable portion of 10% by weight or less.

14. A hollow vessel for heat sterilization as claimed in claim 12, wherein the ethylene/α-olefin random copolymer (B) is obtained by a random copolymerization of ethylene and an α-olefin in the presence of a catalyst based on vanadium or based on metallocene.

15. A hollow vessel for heat sterilization as claimed in claim 12, wherein the propylene/ethylene/1-butene random copolymer (C) is obtained by a random copolymerization of propylene, ethylene and 1-butene in the presence of a catalyst based on metallocene.

16. A hollow vessel for heat sterilization as claimed in claim 15, wherein the catalyst based on metallocene comprises (I): a transition metal compound (a) of bridged type represented by the formula (1)

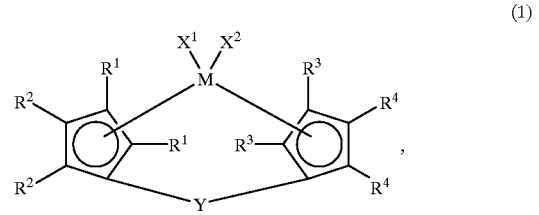

(1)

in which M denotes a transition metal atom of Groups IV–VIB of the periodic table; $R^1$, $R^2$, $R^3$ and $R^4$ represent each, identical with or different from each other, a hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group or a phosphorus-containing group or may form a ring by combining a part of each of the groups adjoining each other together with the carbon atoms bound thereto; $X^1$ and $X^2$ stand each, identical with or different from each other, for hydrogen atom, a halogen atom, a hydrocarbyl of 1–20 carbon atoms, a halogenated hydrocarbyl of 1–20 carbon atoms or an oxygen- or sulfur-containing group; Y represents a divalent hydrocarbyl of 1–20 carbon atoms, a divalent halogenated hydrocarbyl of 1–20 carbon atoms, a divalent silisium- or germanium-containing group or stands for —O—, —CO—, —S—, —SO—, —SO$_2$—, —NR$^5$—, —P(R$^5$)—, —P(=O)(R$^5$)—, —BR$^5$— or —AlR$^5$— with R$^5$ being hydrogen atom, a halogen atom, a hydrocarbyl of 1–20 carbon atoms or a halogenated hydrocarbyl of 1–20 carbon atoms, and (II) at least one compound capable of activating the above-identified transition metal compound (a) of bridged type and selected from the group consisting of (b) an organoaluminum compound, (c) an organoaluminum-oxy compound and (d) an ionizing ionic compound capable of forming an ion pair by reacting with the transition metal compound of bridge type represented by the above formula (1).

17. A hollow vessel for heat sterilization as claimed in claim 12, wherein the vessel is one in which a food product is enclosed and is subjected to a steam sterilization.

18. A hollow vessel for heat sterilization as claimed in claim 12, wherein the vessel is one in which medical goods are enclosed and are subjected to a steam sterilization.

19. A hollow vessel for heat sterilization as claimed in claim 12, wherein the polyolefin resin comprises 50–95 parts by weight of the polypropylene resin (A), 3–40 parts by weight of the ethylene/α-olefin random copolymer (B) and 2–30 parts by weight of the propylene/ethylene/1-butene random copolymer, with the amounts of (A), (B) and (C) summing up to 100 parts by weight.

20. A hollow vessel for heat sterilization as claimed in claim 19, wherein the ethylene/α-olefin random copolymer (B) is obtained by a random copolymerization of ethylene and an α-olefin in the presence of a catalyst based on vanadium or based on metallocene.

21. A hollow vessel for heat sterilization as claimed in claim 19, wherein the propylene/ethylene/1-butene random copolymer (C) is obtained by a random copolymerization of propylene, ethylene and 1-butene in the presence of a catalyst based on metallocene.

22. A hollow vessel for heat sterilization as claimed in claim 19, wherein the polypropylene resin (A) comprises at least one selected from the group consisting of propylene homopolymers, propylene/α-olefin random copolymers having a content of the α-olefin other than propylene of 10 mole % or less and propylene/α-olefin block copolymers having a content of n-decane extractable portion of 10% by weight or less.

23. A hollow vessel for heat sterilization as claimed in claim 22, wherein the propylene/ethylene/1-butene random copolymer (C) is obtained by a random copolymerization of propylene, ethylene and 1-butene in the presence of a catalyst based on metallocene.

24. A hollow vessel for heat sterilization as claimed in claim 22, wherein the ethylene/α-olefin random copolymer (B) is obtained by a random copolymerization of ethylene and an α-olefin in the presence of a catalyst based on vanadium or based on metallocene.

25. A hollow vessel for heat sterilization as claimed in claim 24, wherein the propylene/ethylene/1-butene random copolymer (C) is obtained by a random copolymerization of propylene, ethylene and 1-butene in the presence of a catalyst based on metallocene.

26. A hollow vessel for heat sterilization as claimed in claim 25, wherein the catalyst based on metallocene comprises (I): a transition metal compound (a) of bridged type represented by the formula (1)

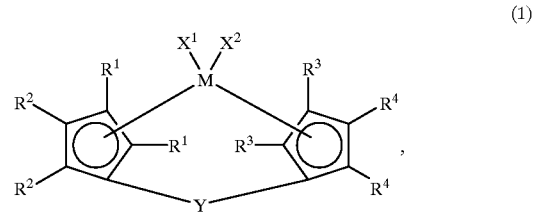

in which M denotes a transition metal atom of Groups IV–VIB of the periodic table; $R^1$, $R^2$, $R^3$ and $R^4$ represent each, identical with or different from each other, a hydrogen atom, a halogen atom, a hydrocarbyl of 1–20 carbon atoms, a halogenated hydrocarbyl of 1–20 carbon atoms, a silicium-containing group, an oxygen-containing group, a sulfur-containing group, a nitrogen-containing group, or a phosphorus-containing group or may form a ring by combining a part of each of the groups adjoining each other together with the carbon atoms bound thereto; $X^1$ and $X^2$ stand each, identical with or different from each other, for hydrogen atom, a halogen atom, a hydrocarbyl of 1–20 carbon atoms, a halogenated hydrocarbyl of 1–20 carbon atoms or an oxygen- or sulfur-containing group; Y represents a divalent hydrocarbyl of 1–20 carbon atoms, a divalent halogenated hydrocarbyl of 1–20 carbon atoms, a divalent silisium- or germanium-containing group or stands for —O—, —CO—, —S—, —SO—, —SO$_2$—, —NR$^5$—, —P(R$^5$)—, —P(=O)(R$^5$)—, —BR$^5$— or —AlR$^5$— with R$^5$ being hydrogen atom, a halogen atom, a hydrocarbyl of 1–20 carbon atoms or a halogenated hydrocarbyl of 1–20 carbon atoms, and (II) at least one compound capable of activating the above-identified transition metal compound (a) of bridged type and selected from the group consisting of (b) an organoaluminum compound, (c) an organoaluminum-oxy compound and (d) an ionizing ionic compound capable of forming an ion pair by reacting with the transition metal compound of bridge type represented by the above formula (1).

27. A hollow vessel for heat sterilization as claimed in claim 26, wherein the vessel is one in which a food product is enclosed and is subjected to a steam sterilization.

28. A hollow vessel for heat sterilization as claimed in claim 26, wherein the vessel is one in which medical goods are enclosed and are subjected to a steam sterilization.

* * * * *